United States Patent

Hayashi et al.

Patent Number: 5,883,636
Date of Patent: Mar. 16, 1999

[54] DRAWING SYSTEM

[75] Inventors: Naoki Hayashi; Kazuo Shibuta, both of Nakai-machi, Japan

[73] Assignee: Fuji Xerox Co., Ltd., Tokyo, Japan

[21] Appl. No.: 733,598

[22] Filed: Oct. 18, 1996

[30] Foreign Application Priority Data

Oct. 20, 1995 [JP] Japan .................................. 7-272151

[51] Int. Cl.⁶ ............................................. G06T 1/60
[52] U.S. Cl. ........................................ 345/441; 345/433
[58] Field of Search .................................. 345/433, 441, 345/442, 443

[56] References Cited

U.S. PATENT DOCUMENTS

| 5,673,421 | 9/1997 | Shirakawa | 345/441 |
| 5,767,860 | 6/1998 | Zimmer | 345/441 |

FOREIGN PATENT DOCUMENTS

| A-4-349522 | 12/1992 | Japan . |
| A-6-266328 | 9/1994 | Japan . |
| A-7-72978 | 3/1995 | Japan . |

*Primary Examiner*—Phu K. Nguyen
*Assistant Examiner*—Cliff N. Vo
*Attorney, Agent, or Firm*—Oliff & Berridge, PLC

[57] ABSTRACT

A drawing system enables the user to prepare an attractive drawing easily from a simple drawing drawn by the user, when the user prepares a drawing electrically. Original read section reads an image for specifying elements and positioning relation of the elements on an input paper. The elements and the positioning relation of the elements are determined in accordance with the read image, and are stored in the element data storage section. At the same time, a drawing guide is selected from the drawing guide selection section. In accordance with the selected drawing guide, coordinates where drawing elements can be placed, forms of the drawing elements, and colors of the drawing elements are changed to prepare an attractive drawing.

12 Claims, 20 Drawing Sheets

| DRAWING GUIDE | | | PURPOSE OF DRAWINGS | CATEGORY | | |
|---|---|---|---|---|---|---|
| ID | CHARACTER STRING | IMAGE | | USE OF DRAWINGS | VIEW OF DRAWINGS | |
| DG1 | EXTEND |  | BECOME BETTER | PLANNING EXPLANATION | RISING GRADIENT | |
| DG2 | CONVERGE |  | CHANGE | PLANNING EXPLANATION | FALLING GRADIENT | |
| DG3 | FOCUS |  | INDICATE POINT | GENERAL USE | UNSTABLE | |
| ... | ... | ... | ... | ... | ... | |

| ID | DIRECTION AND DISTANCE SETTING RULE | COLOR SETTING RULE | | | FORM SETTING RULE | |
|---|---|---|---|---|---|---|
| | | BOX | ARROW | TEXT | BOX | ARROW |
| DG1 | RULE 2(CALCULATE, 1.24) | BLUE | WATER | PALE YELLOW | BOX | ARROW-HEAD |
| DG2 | RULE 2(CALCULATE, 0.76) | GRAY | GRAY GRADATION | RED | DISC | TRIANGLE |
| DG3 | RULE 4(FILL POINT, −15) | SILVER | BLACK | BLACK | STONE PLATE | ARROW-HEAD |
| ... | ... | | | | METAL PLATE | |

FIG.4

DRAWING SYSTEM

BACKGROUND OF THE INVENTION

1. Field of the Invention

This invention relates to a drawing system for processing digital image information for electronic drawing, such as a wordprocessor or a digital copier that can handle graphics.

2. Description of the Related Art

In recent years, it has been common practice for the end user to use a graphical UI (user interface) for electronic drawing with a wordprocessor, etc. The prevalence of computer systems containing color scanners and color printers provides an environment in which not only graphics designers, but also general users can prepare color drawings. Since color drawings make a high appeal to persons as compared with monochrome drawings, needs for the user to easily prepare beautiful and easy-to-understand drawings for proposals and presentation for clients are high.

It is comparatively easy for the general user rather than the graphics designer to prepare simple drawings which show the relation between drawing elements by using circles, arrows, or the like, if he or she does not require the attractiveness of drawings. However, it is difficult for the general user having no knowledge of design to call up how he or she changes the simple drawings so as to prepare beautiful and easy-to-understand drawings.

To prepare a drawing in the conventional techniques used for electronic color drawing in word processors, graphics software, and the like, the user repeats the steps of creating drawing elements such as lines, polygons, and ellipses and placing the created drawing elements on a two-dimensional plane. In the edit operation system provided by the drawing system based on the conventional techniques, the user directly specifies the position, size and color of each drawing element.

It is rather easy for the general user having no design knowledge to make a drawing attractive to a certain degree, such as "to make the form of the drawing element a circle" or "to align rectangles on a line", by using electric drawing apparatuses as compared with by using paper and pencils. However, it is difficult for the general user to prepare beautiful drawings by balancing positions, forms and coloring of the drawing elements.

SUMMARY OF THE INVENTION

The present invention has been made in view of the above circumstances and has an object to provide a drawing system that can easily prepare an attractive drawing from a simple picture drawing by the user when the user carries out electronic drawing. To achieve the object and in accordance with the purpose of the invention, as embodied and broadly described herein, a drawing system comprising: first specifying means for specifying one drawing element which is included in a drawing to be created and for specifying the positioning relation of the specified drawing element and the other drawing element; second specifying means for specifying a drawing rule which is applied to the drawing to be created; image generating means for generating image information representing the drawing to be created in accordance with the specifying of the first specifying means and second specifying means.

With this configuration, when the user only specifies a drawing element, a positioning relation between the drawing elements and a drawing rule, a drawing matched with the specified drawing rule, namely a drawing with attractive design, can be prepared.

The first specifying means comprises: reading means for reading a picture drawn on a medium, to generate image information used for instruction; detecting means for detecting the drawing element which is included in the drawing to be created and said positioning relation of the specified drawing element and the other drawing element from the image information used for instruction.

With this configuration, the user can specify the drawing elements and the layout of them by a rough drawn on a medium. The attribute of the drawing element can also be specified easily.

BRIEF DESCRIPTION OF THE DRAWINGS

FIGS. 4 illustrates a data structure of the option-to-setting rule correspondence storage section 108 in the embodiment;

DETAILED DESCRIPTION OF THE PREFERRED EMBODIMENT

Figure 1:
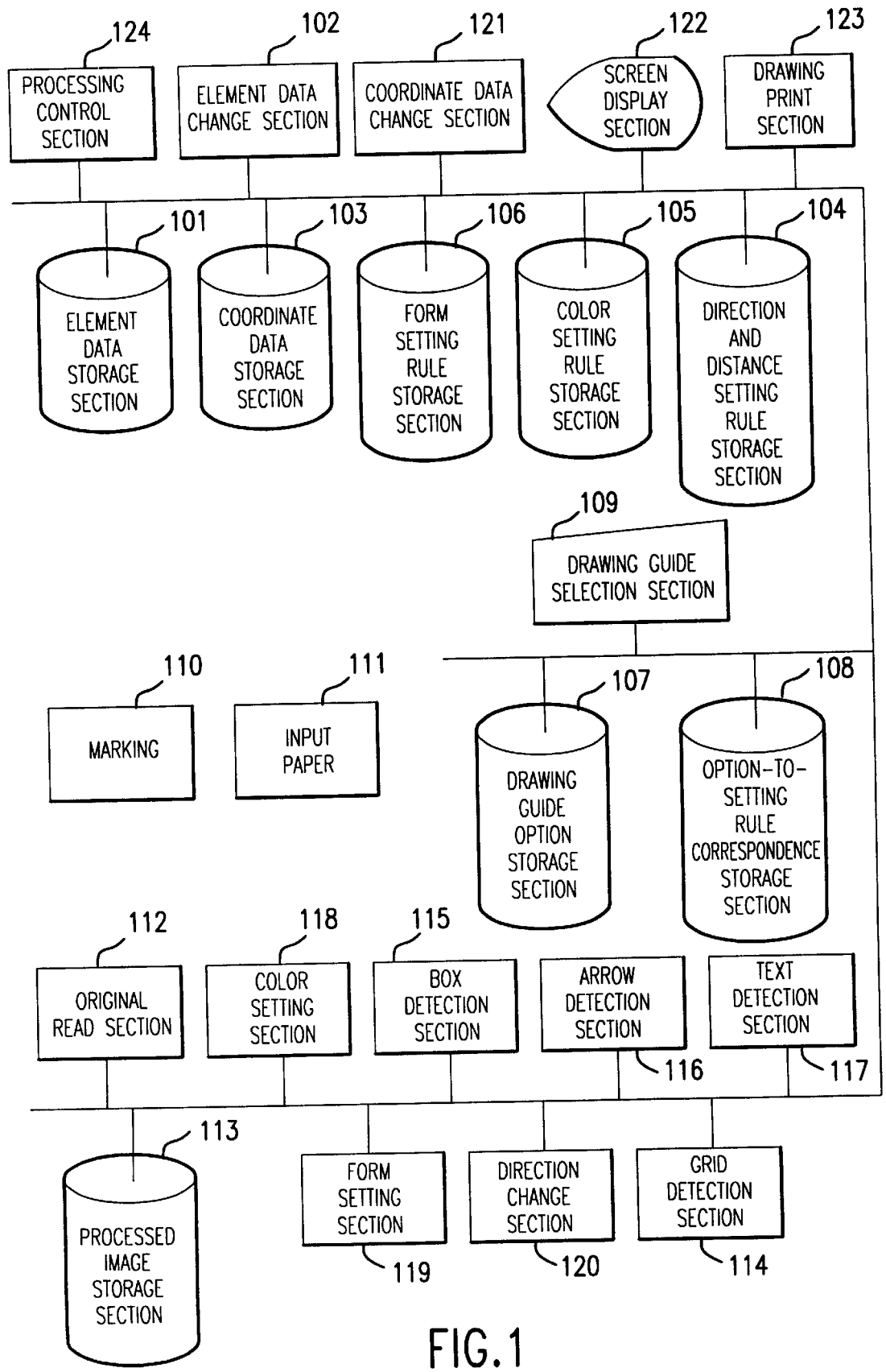
FIG. 1 is a block diagram illustrative of the embodiment of the present invention on the whole.

Now, a description will be given in more detail of the preferred embodiment of the present invention with reference to the accompanying drawings. Here, a general flow of the drawing operation using the drawing system is discussed before the explanation of the configuration and operation of the drawing system.

In the embodiment, the user draws a picture on paper on which a grid is printed (input paper 111) with a color marker pen. The input paper on which the picture is drawn is optically read. At the same time, when the user selects a design of the picture from options on a touch panel, a color original document with elements changed based on the selected design is output.

In the embodiment, the three types of drawing elements, that is "box", "arrow" and "text", are available. The "box" is drawn with a closed curve on input paper by the user, such as a circle or a square. The "arrow" is drawn in the form of →. The "text" is a character string written onto the drawing.

In the embodiment, the user is given color marker pens of different colors for drawing according to the drawing element types of "box", "arrow", and "text". The system uses the color differences to detect the drawing element type.

The color of the grid printed on input paper also differs from the colors of the color marker pens. The user draws a picture with any color marker pen with the grid as the reference. The system uses the color difference between the drawing elements and the grid to recognize the elements and the grid separately and detect the positioning relationships among the drawing elements with the grid as the reference.

Next, the configuration of the drawing system of the embodiment will be discussed. This drawing system can be realized as software for a dedicated wordprocessor or a general-purpose personal computer, workstation, or host computer.

FIG. 1 shows the drawing system on the whole. In the figure, the drawing system has an original read section 112 and a drawing guide selection section 109 for receiving user's commands. The original read section 112 reads an original prepared by the user performing marking operation on input paper 111. The user's commands are executed in an execution section comprising an element data change section 102, a coordinate data change section 121, a drawing print section 123, a grid detection section 114, a box detection section 115, an arrow detection section 116, a text detection section 117, a color setting section 118, a form setting section 119, a direction change section 120, etc. A processing control section 124 controls the entire drawing system.

In execution of the sections, a storage section stores various pieces of data. It comprises an element data storage section 101, a coordinate data storage section 103, a direction and distance setting rule storage section 104, a color setting rule storage section 105, a form setting rule storage section 106, a drawing guide option storage section 107, an option-to-setting rule correspondence storage section 108, and a processed image storage section 113. The drawing being prepared is displayed on a screen display section 122 each time, and finally the prepared drawing is printed by a drawing print section 123.

Functions of the sections will be discussed in detail.
[Element data storage section 101]

This element data storage section 101 stores information concerning the form, color, and placement for each drawing element. In the embodiment, attribute data concerning the drawing elements is stored in the table format. The table lists the correspondences between the attributes and attribute values. One table is prepared for each element and is assigned an ID to uniquely identify the table in the system. The attributes will be discussed below.

The attributes include "position", "color", "form", "text", and "display order". The attribute "position" indicates the position on a two-dimensional plane of the element and takes a coordinate ID of coordinates where the element can be placed (described later) as an attribute value. The attribute "color" indicates the color of the drawing element and takes a value representing the color of the drawing element on $L^*a^*b^*$ of a scale defined by International Association of Illumination as an attribute value. The attribute "form" indicates the form of the drawing element and takes a value describing the form of the drawing element in Postscript (trademark of Adobe Systems, Inc.) of a page description language as an attribute value. The attribute "text" indicates the contents of the text if the element type is a text, and takes color bit map data as an attribute value. The attribute "display order" indicates the display order of the element. Since drawings are overwritten one on another in the embodiment, if elements are overlapped, the drawing in the later display order is seen on this side of the user. The attribute value of the attribute "display order" takes a unique positive value.

[Element data change section 102]

The element data change section 102 changes information stored in the element data storage section 101 in response to an instruction from other sections. Preparation of a drawing element, namely, preparation of a new table is executed according to an instruction sent from other sections. Upon reception of the instruction, first a new table is prepared in the element data storage section 101. The values of the attributes at the point in time are as follows:

* Values of attributes "color", "form", and "text" are nil.
* Value of attribute "display order" takes one added to the maximum value of the attribute values that the tables existing in the element data storage section 101 has at the point in time.

As a result of execution of the preparation instruction, the ID of the new prepared table is returned.

Direct assignment instruction are provided for setting the attribute values of the attributes "color", "form", and "text". Each of the assignment instructions takes the table ID, the assigned attribute, and the assigned value as arguments. Upon reception of the instruction, the element data change section 102 searches the tables stored in the element data storage section 1.01 for a table having the ID passed as the argument, and replaces the attribute values of the table with the passed value.

For the attribute "color", relative change instructions of lightness, saturation, and hue are provided as attribute value change instructions. Each of the change instructions takes the table ID and the change amount from the current value as arguments. As in the above described attribute value setting, the table ID is used to find the table to which a new value is to be assigned. The change amount is a real value; only the hue is changed in radian units. To change the lightness, the change amount is added to the current $L^*$ value. To change the saturation and hue, the saturation and hue are calculated from the current $a^*$ and $b^*$ values and the change amount are added to them, then the addition results are distributed to the $a^*$ and $b^*$ values. For the hue change amounts, it is assumed that the "plus change" direction is clockwise in an a-b coordinate system (a is the horizontal axis and b is the vertical axis).

For the attribute "form", size and direction change instructions are provided as attribute value change instructions. Each of the change instruction takes the table ID and a real value as arguments. As in the above-described attribute value setting, the table ID is used to find the table to which a new value is to be assigned. To change the size, the given real value is handled as a magnification to the length in percent units and the current attribute value is changed so as to set the size responsive to the value. To change the direction, the given real value is handled as a rotation amount in degree units and the current attribute value is changed so that the direction is changed in response to the value. The direction change is a relative change, and it is assumed that the "plus change" direction is clockwise with respect to the top of an original.

If the element type is specified in place of the table ID as a specification method in the change instructions, change based on another argument value is applied to all elements of the specified type.

[Coordinate data storage section 103]

This coordinate data storage section 103 stores information concerning coordinates on a two-dimensional plane on which drawing elements can be placed, which are hereinafter called "placeable coordinates". In the embodiment, the number of placeable coordinates matches the number of grid points of the grid printed on input paper. Data of one coordinate set consists of an coordinate ID and values indicating the coordinate position on the two dimensions. The coordinate ID is used to uniquely identify the coordinate. In the embodiment, it is represented by a two-dimensional positive value pair, such as {1, 1}.

Figure 2:
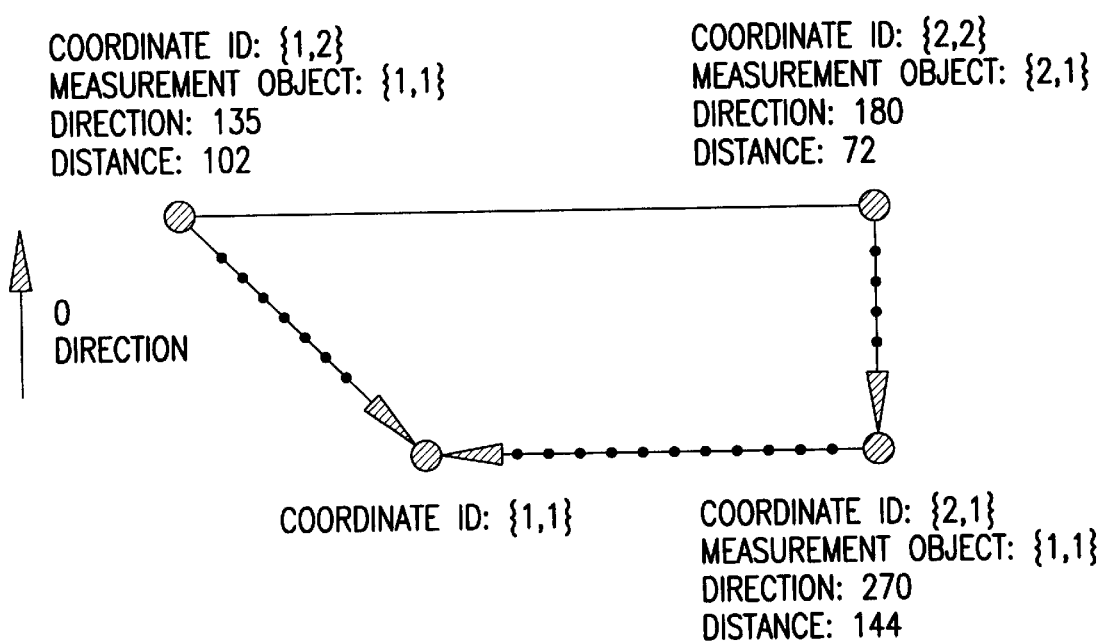
FIG. 2 is a diagram illustrative of coordinate data description in the first embodiment of the invention.

The values indicating the position are indicated by the direction and distance with respect to a different coordinate point as a measurement object. The coordinate point which becomes the measurement object is one point, which is indicated by the coordinate ID. The direction indicates the direction of the measurement object from the coordinate point and is indicated by the clockwise angle with the direction which becomes the top at the print time as 0 degrees. The distance is indicated by a non-negative integer value in point units of the print units. FIG. 2 shows a conceptual diagram of the values indicating the position. For example, the upper-left coordinate point {1, 2} is indicated by the direction of 135 degrees and the distance of 102 points with the coordinated point {1, 1} as the measurement object (reference).

[Direction and distance setting rule storage section 104]

The direction and distance setting rule storage section 104 stores rules concerning the positioning relation between drawing elements. In this embodiment, as the rule to determine the positioning relation between elements, the section stores the rule concerning the setting of the direction and distance to the coordinate data stored in the coordinate data storage section.

In this embodiment, four rules regarding the positioning relation between drawing elements are provided. These rules are described as a sequential procedure by a program having a syntax like the C language.

The rule 1 provides equally spaced coordinate placement and a grid-like composition on the whole. In the rule 1 (rule_1 (dis_val)), the distance between contiguous grid points is set to the dis_val value in all coordinates. The rule 1 is described in a manner like the C language as follows.

```
rule_1 (dis_val)
{
    for (i=1; XPOINTMAX; i++) {
        for (j=1;YPOINTMAX;j++) {
            p=point_data({i,j});
            p->position->distance=dis_val;
            if (j==1) }
```

-continued

```
            p->position->angle=270;
            if (i==1) }
                p->position->reference=0;
            else
                p->position->reference={i-1,1};
        }
        else {
            p->position->angle =180;
            p->position->reference ={i,j-1};
        }
    }
}
}
```

Figure 15:
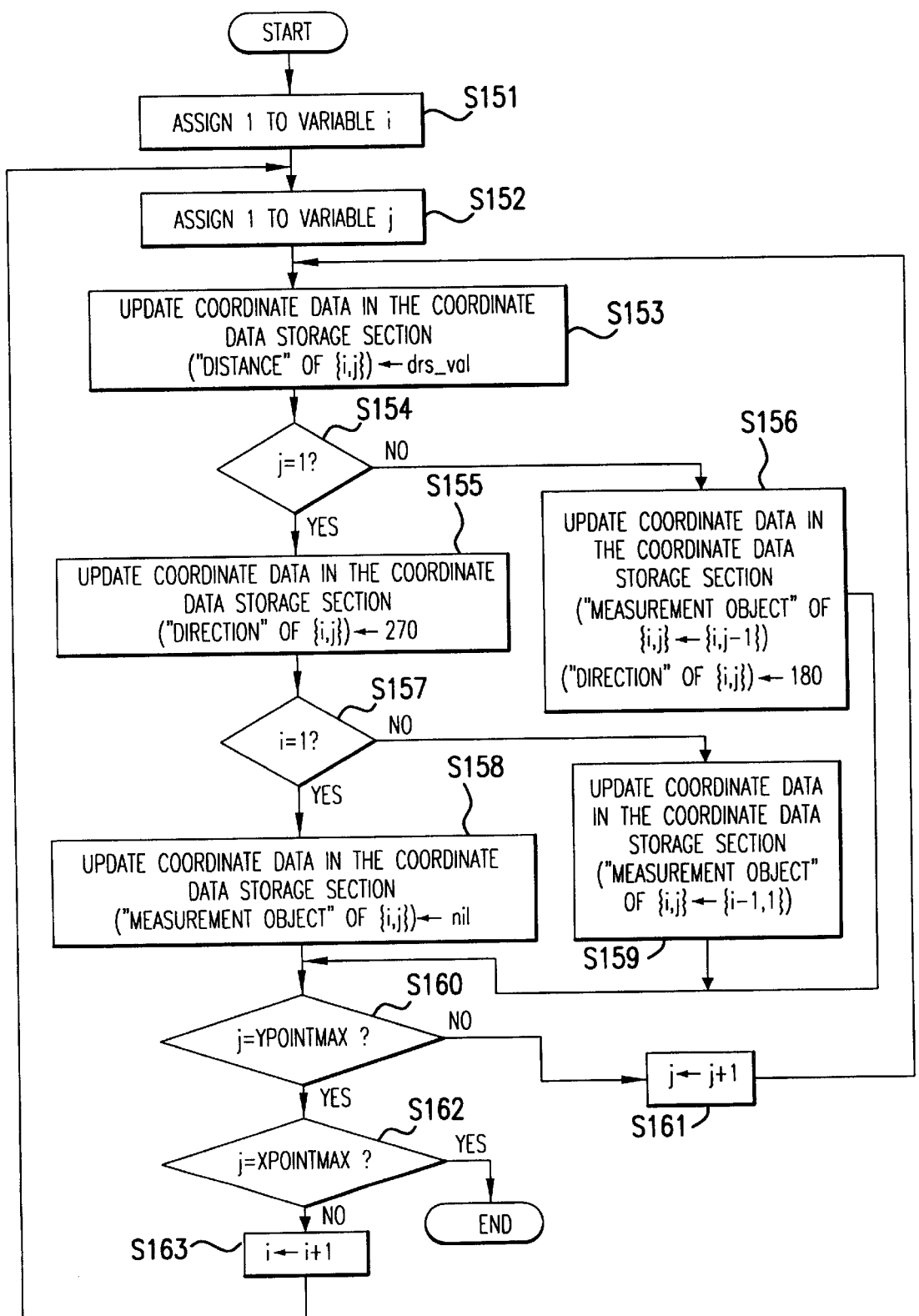
FIG. 15 is a flowchart of the procedure of rule 1 stored in direction and distance setting rule storage section 104.

FIG. 15 shows the operation executed according to the rule 1. The processing of rule 1 will be discussed with reference to the flowchart shown in FIG. 15. First, 1 is assigned to variable i at step 151. Next, 1 is assigned to variable j at step 152. At step 153, the coordinate data in the coordinate data storage section is updated so that the "distance" value of attribute values indicating the position of placeable coordinates with coordinate ID {i, j} matches the value of argument "dis_val".

Next, at step 154, it is checked whether or not the variable j is 1. As a result of this check, if the variable j is 1, then at step 155, the coordinate data stored in the coordinate data storage section is updated so that the "direction" value of attribute values indicating the position of placeable coordinates with coordinates with coordinate ID {i, j} is set to 270. Then, the control goes to step 157. Meanwhile, as a result of the check at step 154, if variable j is not 1, then at step 156, the coordinate data in the coordinate data storage section is updated so that the "direction" value and "measurement object" value of attribute values indicating the position of placeable coordinates with coordinate ID {i, j} are set to 180 and {i, (j−1) } respectively. Then, control goes to step 160.

It is checked at step 157 whether or not the variable i is 1. If the variable i is 1, then control goes to step 158 and the coordinate data in the coordinate data storage section is updated so that the "measurement object" value of attribute values indicating the position of placeable coordinate with coordinate ID {i, j} is set to "nil". Then, control goes to step 160. Meanwhile, if the variable i is not 1 at step 157, control goes to step 159 and the coordinate data in the coordinate data storage section is updated so that the "measurement object" value of attribute values indicating the position of placeable coordinate ID {i, j} is set to {(i−1), j}. Next, control goes to step 160.

At step 160, it is checked whether or not the value of variable j equals "YPOINTMAX". As a result of this check, if value of variable j does not equal "YPOINTMAX", the variable j is incremented at step 161 and the control returns to step 153. Then, the processing starting at step 15 is continued. Meanwhile, if the value of variable j equals "YPOINTMAX" as a result of the check at step 160, then control goes to step 162 and it is checked whether or not the value of the variable i equals "XPOINTMAX". If the value of the variable i does not equal "XPOINTMAX" as a result of the check, control goes to step 163 at which the variable i is incremented, and control returns to step 152. The process starting at step 152 is continued. Meanwhile, if the value of the variable i equals "XPOINTMAX" at step 162, then the process is terminated. According to rule 1 of the position rules, equally spaced coordinate points are thus placed for forming a composition like a grid on the whole.

Rule 2 is a rule for geometrically widening coordinate placement to form a composition widening toward the end on the whole. Rule 2 (rule_2 (dis_val, ratio)) sets grid point spacing so that spacing widens in the ratio of argument "ratio" with the initial value of the spacing as the value of argument "dis_val". Rule 2 is described as below.

```
rule_2 (dis_val, ratio)
{
    current_distance=dis_val;
    for (i=1; XPOINTMAX; i++) {
        for (j=1; YPOINTMAX; j++) {
            p=point_data({i,j});
            p->position->distance = current_distance;
            if (j== 1) {
                p->position->angle=270;
                if (i==1)
                    p->position->reference=0;
                else
                    p->position->reference={i-1, 1};
            }
            else {
                p->position->angle=180;
                p->position->reference={i,j-1}
            }
        }
        current_distance*=ratio;
    }
}
```

Figure 16:
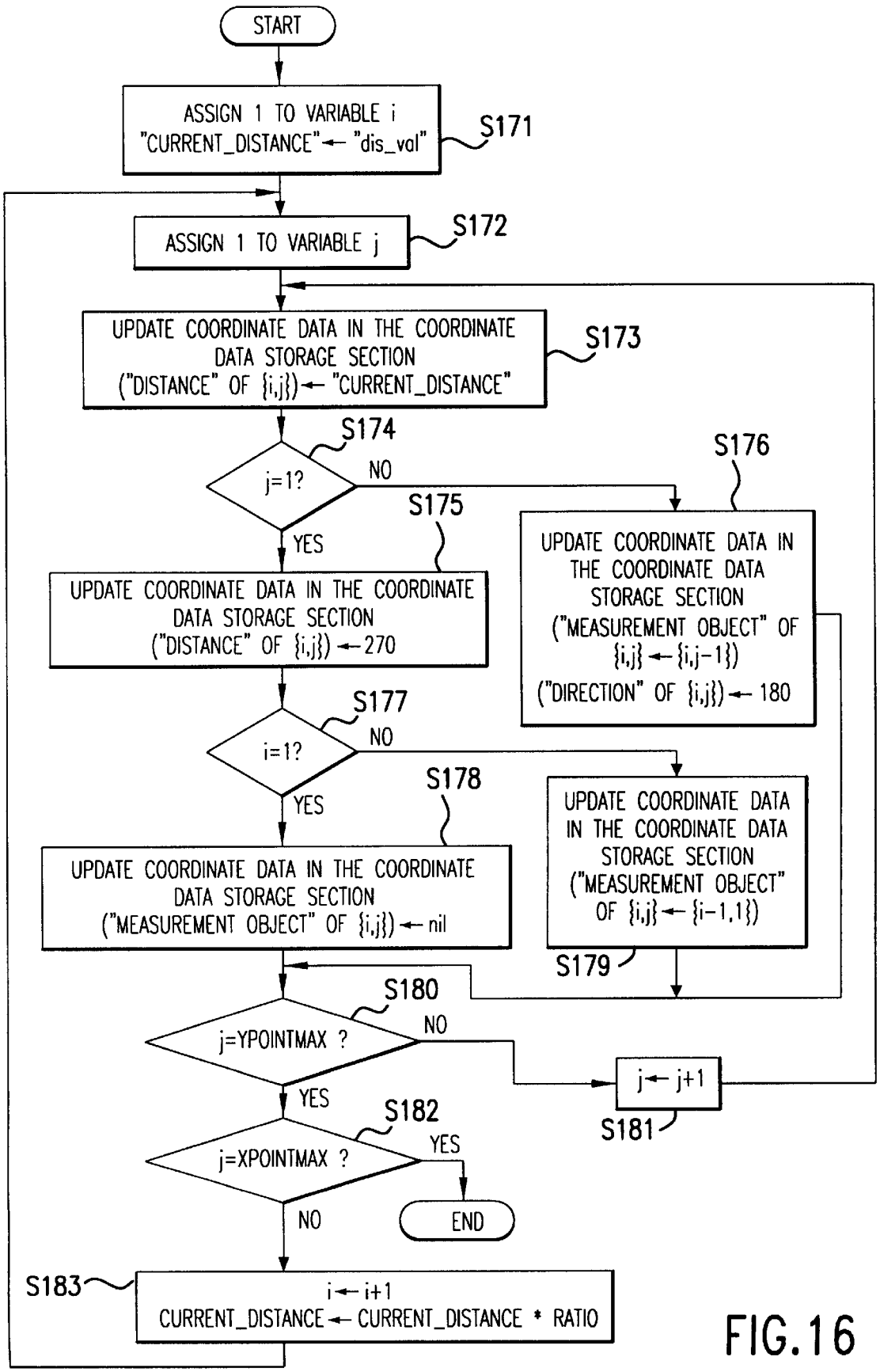
FIG. 16 is a flowchart illustrative of the procedure of rule 2 stored in direction and distance setting rule storage section 104.

FIG. 16 shows the flowchart of the operation executed according to rule 2. The processing according to rule 2 for position regulation will be discussed with reference to the flowchart shown in FIG. 16. First, 1 is assigned to variable i and the value of argument "dis_val" is assigned to "current_distance" at step 171. Next, 1 is assigned to variable j at step 172. At step 173, the coordinate data stored in the coordinate data storage section is updated so that the "distance" value of attribute values indicating the position of placeable coordinates with coordinate ID {i, j} matches the value of the variable "current_distance".

Next, at step 174, it is checked whether or not the variable j is 1. If the variable j is 1, then at step 175, the coordinate data in the coordinate data storage section is updated so that the "direction" value of attribute values indicating the position of placeable coordinates with coordinate ID {i, j} is set to 270. Then, control goes to step 177. Meanwhile, if the variable j is not 1 at step 174, then at the step 176, the coordinate data in the coordinate data storage section is updated so that the "direction" value and "measurement object" value of attribute values indicating the position of placeable coordinates with coordinate ID {i, j} are set to 180 and {i, (j-1)} respectively. Then, control goes to step 180.

Next, at step 177, it is checked whether or not the variable i is 1. If the variable i is 1, then at step 178, the coordinate data in the coordinate data storage section is updated so that the "measurement object" value of attribute values indicating the position of placeable coordinates with coordinate ID {i, j} is set to "nil". Then, control goes to step 180. Meanwhile, if the variable i is not 1 at step 177, then control goes to step 179 at which the coordinate data in the coordinate data storage section is updated so that the "measurement object" value of attribute values indicating the position of placeable coordinates with coordinate ID {i, j} is set to { (i-1), j}. Next, control goes to step 180. At step 180, it is checked whether or not the value of the variable j equals "YPOINTMAX". If the value of the variable j does not equal "YPOINTMAX" as a result of the check, the variable j is incremented at step 181, and control returns to step 173. Then, the process starting at step 173 is continued. Meanwhile, if the value of the variable j equals "YPOINTMAX" by the check at step 180, then it is checked whether or not the value of variable i equals "XPOINTMAX" at step 182. If the value of the variable i is not equal to "XPOINTMAX", control toes to step 183 at which the variable i is incremented and the value of variable "current_distance" multiplied by the value of the augment "ratio" is assigned to the variable "current_distance". Then control returns to step 172, and the processing starting at step 17 is continued. Meanwhile, if the value of variable i is equal to "XPOINTMAX" at step 182, this processing is terminated. According to rule 2 of the position rules, the spacing of the coordinate point are widened by equal ratio and a composition widening toward the end on the whole can be formed.

Rule 3 is a rule to align the coordinate points on concentric circles, any one of which is determined as the center. Rule 3 (rule_(center_point, dis_val)) positions coordinate points on concentric circles with the cooodinate point of the value of the argument "center_point" as center point and with the value of the argument "dis_val" as difference of diameter. Rule 3 is described as below.

```
rule_3 (center_point, dis_val)
{
    reset_reference(center_point);
    for (i=1; XPOINTMAX; i++) {
        for (j=1; YPOINTMAX; j++) {
            p=point_data(i,j);
            if (center_point[1]==j)
                p->position->distance=0;
            else
                p->position->distance=dis_val;
        }
    }
    if (center_point[1] > 1 && center_point[1] < YPOINTMAX)
        right_divide = (XPOINTMAX-center_point[0])*2 + 1;
        left_divide = center_point[0] * 2 - 1;
    else {
        if (center_point[0] >= (XPOINTMAX / 2))
            right_divide=(XPOINTMAX-center_point[0])*2 - 1;
            left_divide = center_point[0] - 1;
        else
            right_divide = XPOINTMAX - center_point[0];
            left_divide = center_point[0]
    }
    if (right divide > 1) {
        divide_angle = 180 / right_divide;
        current_angle = divide_angle;
        for (i=center_point[0]+1; XPOINTMAX; i++) {
            for (j=center_point[1]+1; YPOINTMAX; j++) {
                p=point_data({i,j});
                p->position->angle+= current_angle;
            }
            for (j=1; center_point[1]-1; j++) {
                p=point_data({i,j});
                p->position->angle-= current_angle;
            }
            current_angle += divide_angle;
        }
    }
    if (left_divide > 1) {
        divide_angle = 180 / left_divide;
        current_angle = divide_angle;
        for (i=center_point[0]-1; 1; i--) {
            for (j=center_point[1]+1; YPOINTMAX; j++) {
                p=point_data({i,j});
                p->position->angle -= current_angle;
            }
            for (j=1; center_point[1]-1; j++) {
                p=point_data({i,j});
                p->position->angle += current_angle;
            }
            current_angle += divide angle;
        }
        p=point_data(center_point);
        p->position->reference=0;
    }
}
```

Figure 17:
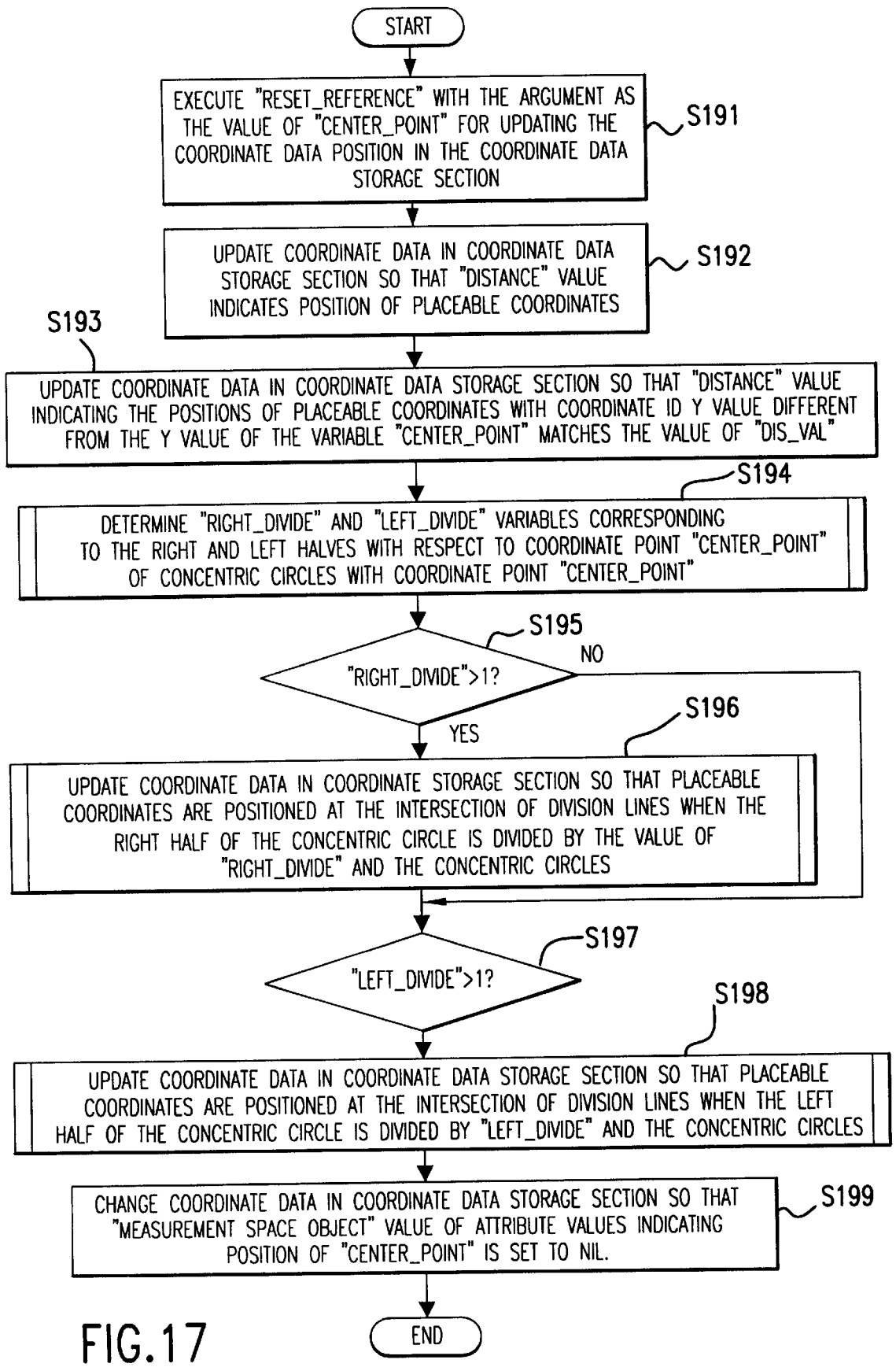
FIG. 17 is a flowchart illustrative of the whole procedure of rule 3 stored in direction and distance setting rule storage section 104.

FIGS. 17 through 20 show flowcharts of the operation executed according to rule 3. The processing of rule 3 will be discussed with reference to the flowcharts shown in FIGS. 17 through 20. Referring first to FIG. 17, when processing is started, system-defined function "reset_reference" is executed with the argument as the value of variable "center_point" for updating the value indicating the position of coordinate data in the coordinate data storage section at step 191. Next, at step 192, the coordinate data in the coordinate data storage section is updated so that the "distance" value of attribute values indicating the position of placeable coordinates whose coordinate ID has the Y value equaling the Y value of the variable "center_point" is set to 0.

Next, at step 193, the coordinate data in the coordinate data storage section is updated so that the "distance" value of attribute values indicating the positions of placeable coordinates whose coordinate ID has the Y value different from the Y value of the variable "center_point" matches the value of the argument "dis_val".

At step 194, what values right and left halves with respect to the coordinate point "center_point" of concentric circles with the coordinate point "center_point" as the center are divided by are determined, and the determined value by which the right half is divided is assigned to variable "right_divide" and the determined value by which the left half is divided is assigned to variable "left_divide".

Figure 18:
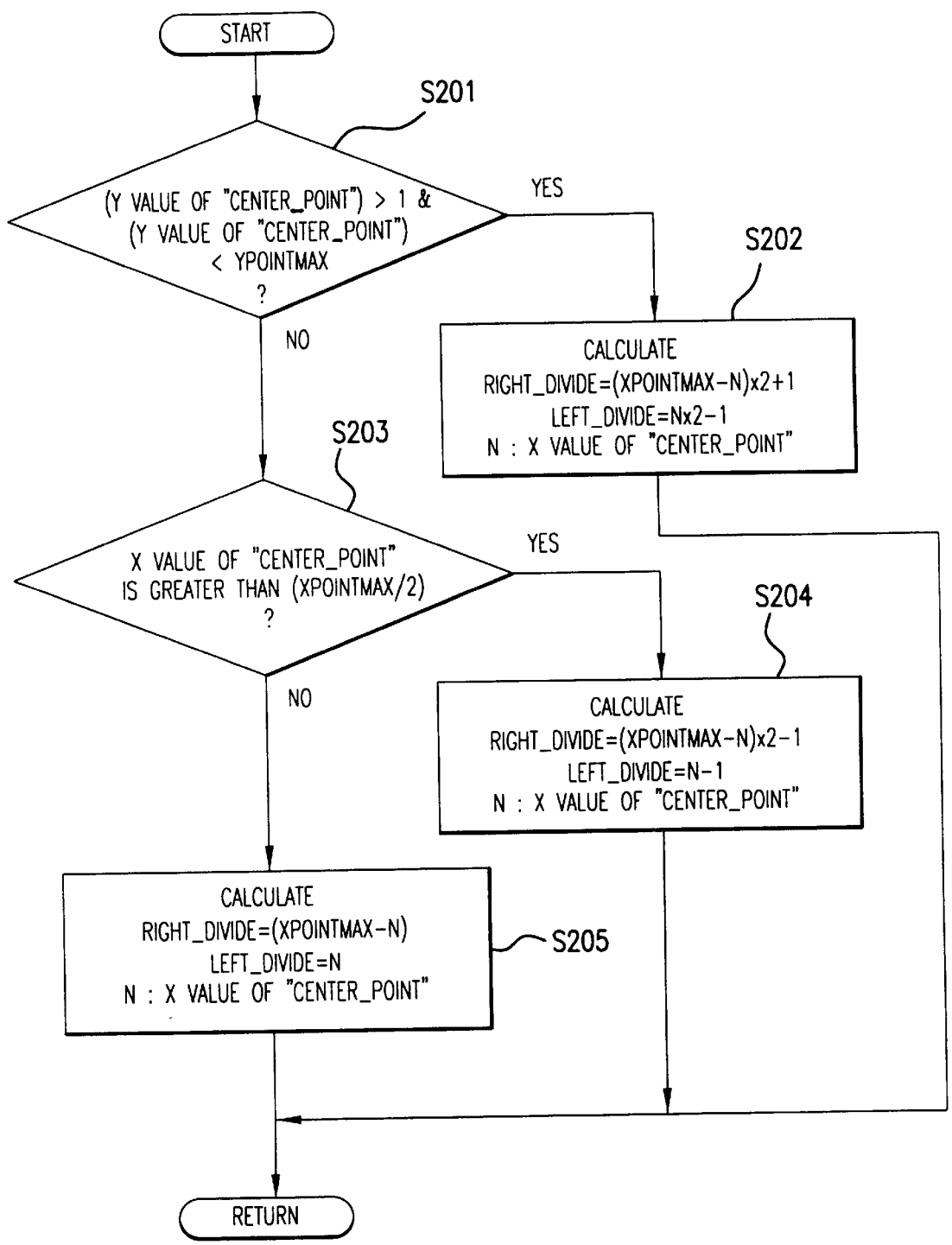
FIGS. 18 through 20 are flowcharts illustrative of the partial procedures of rule 3 stored in direction and distance setting rule storage section 104.

That is, as shown in the flowchart of a subroutine shown in FIG. 18, first at step 201, it is checked whether or not the Y value of variable "center_point" satisfies a first condition that it is greater than 1 and less than "YPOINTMAX". If the Y value of variable "center_point" satisfies the first condition, control goes to step 202 at which the following expression is calculated:

right_divide=("XPOINTMAX"-N)×2+1
left_divide=N×2-1 where N is the X value of "center_point". The calculated right_divide and left_divide values are assigned to the variables "right_divide" and "left_divide". Then, control returns.

If the Y value of "center_point" does not satisfy the first condition at step 201, control goes to step 203. At step 203, it is checked whether or not the X value of "center_point" satisfies a second condition that it is greater than ("YPOINTMAX"/2). If the X value of "center_point" satisfies the second condition, control goes to step 204 at which the following expression is calculated:

right_divide=("XPOINTMAX"-N)×2-1
left_divide=N-1 where N is the X value of "center_point". The found right_divide and left_divide values are assigned to the variables "right_divide" and "left_divide". Then, control returns.

Meanwhile, if the X value of "center_point" does not satisfy the second condition at step 203, control goes to step 205, at which the following expression is calculated:

right_divide="XPOINTMAX"-N
left_divide=N where N is the X value of "center_point". The found right_divide and left_divide values are assigned to the variables "right_divide" and "left_divide". Then, control returns.

Next, at step 195 (FIG. 17), it is checked whether or not the variable "right_divide" is greater than 1. If the variable "right_divide" is equal to or less than 1, control goes to step 197; if the variable "right_divide" is greater than 1, the processing of step 196 is executed.

At step 196, the coordinate data in the coordinate data storage section is updated so that placeable coordinates are positioned at the intersection of division lines when the right half of the concentric circles is divided by the value of the variable "right_divide" and the concentric circles. This process will be discussed later with reference to the flowchart shown in FIG. 19. Then, control goes to step 197.

Next, at step 197, it is checked whether or not the variable "left_divide" is greater than 1. If the variable "left_divide" is equal to or less than 1, the process is terminated; if the variable "left_divide" is greater than 1, the processing of step 198 is executed.

At step 198, the coordinate data in the coordinate data storage section is updated so that placeable coordinates are positioned at the intersections of division lines when the left half of the concentric circles is divided by the value of the variable "left_divide" and the concentric circles. This process will be discussed later with reference to the flowchart shown in FIG. 20. Then control goes to step 199 at which the coordinate data in the coordinate data storage section is changed so that the "measurement object" value of the attribute values indicating the position of "center_point" is set to nil. Then, the process is terminated. According to rule 3 of the position rules, placement of coordinate points (placeable coordinates) is thus arrange on the concentric circles with the coordinate point "center_point" as the center.

Figure 19:
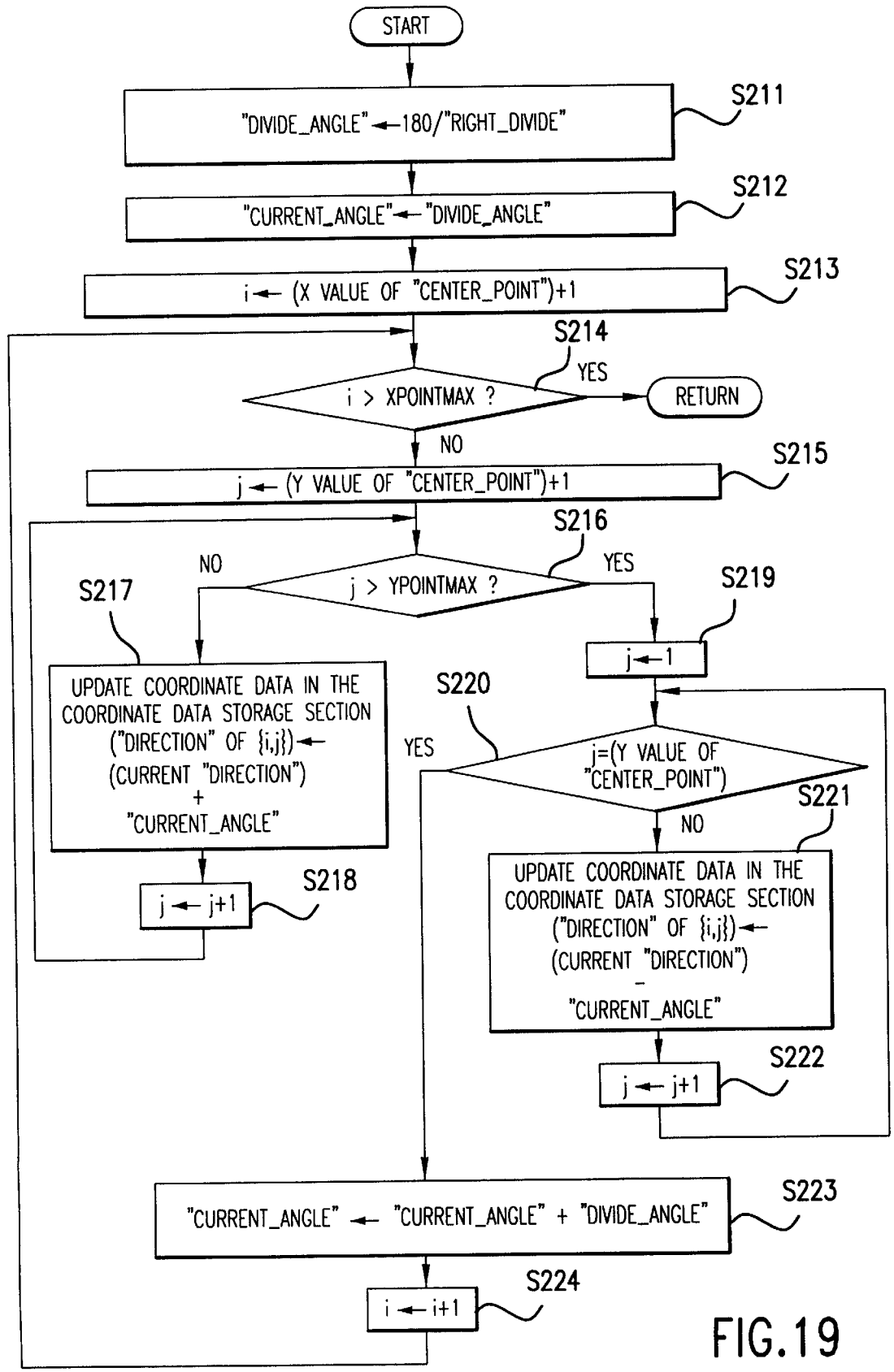

Next, the process of positioning placeable coordinates at the intersections of division lines when the right half of the concentric circles is divides by the value of the variable right_divide and the concentric circles will be discussed with reference to FIG. 19. When the process is started, first at step 211, the value of the variable "right_divide " provided previously at step 194 is used to calculate (180/right_divide ), and the result is assigned to variable "divide_angle". Next, at step 212, the value of the variable "divide_angle" is assigned to variable "current_angle". Next, at step 213, one is added to the X value of the coordinate point "center_point" of the argument and the result is assigned to variable i. Whether or not the variable i is greater than "XPOINTMAX" is determined at step 104. If the variable i is greater than "XPOINTMAX", the control returns.

Meanwhile, if it is determined at step 214, that the variable I is not greater than "XPOINTMAX", control goes to step 215 at which one is added to Y value of the coordinate point center_point of the argument and the result is assigned to variable j. It is checked at step 216 whether or not the variable j is greater than "YPOINTMAX". If the variable j is equal to or less than "YPOINTMAX", the control goes to step 217 at which the coordinate data in the coordinate data storage section is updated so that the "direction" value of attribute values indicating the position of placeable coordinates with coordinate ID {i, j } is set to the value of "current_angle" added to the current "direction" value. At step 218, the variable j is incremented and control returns to step 216. The process starting at step 216 is repeated.

Meanwhile, if the variable j is greater than "YPOINTMAX" at step 216, control goes to step 219 and one is assigned to the variable j for resetting. Next, at step 220, it is checked whether or not the value of the variable j matches the Y value of the coordinate point "current_point" of the argument. If it does not match, control goes to step 221 at which the coordinate data in the coordinate data storage section is updated so that the direction value of attribute values indicating the position of placeable coordinates with coordinate ID {i, j} is set to the value of "current_angle" subtracted from the current "direction" value. At step 222, the variable j is incremented and control returns to step 220. Then the process starting at step 220 is repeated.

Meanwhile, if the value of the variable j matches the Y value of the coordinate point "current_point" of the argument at step 220, control goes to step 223 at which the result of adding the value of the variable "divide_angle" to the value of the variable "current_angle" is assigned to the variable "current_angle". At step 224, the variable i is incremented and control returns to step 214. The process starting at step 214 is repeated. If the variable i is greater than "XPOINTMAX" at step 214, control returns.

Figure 20:
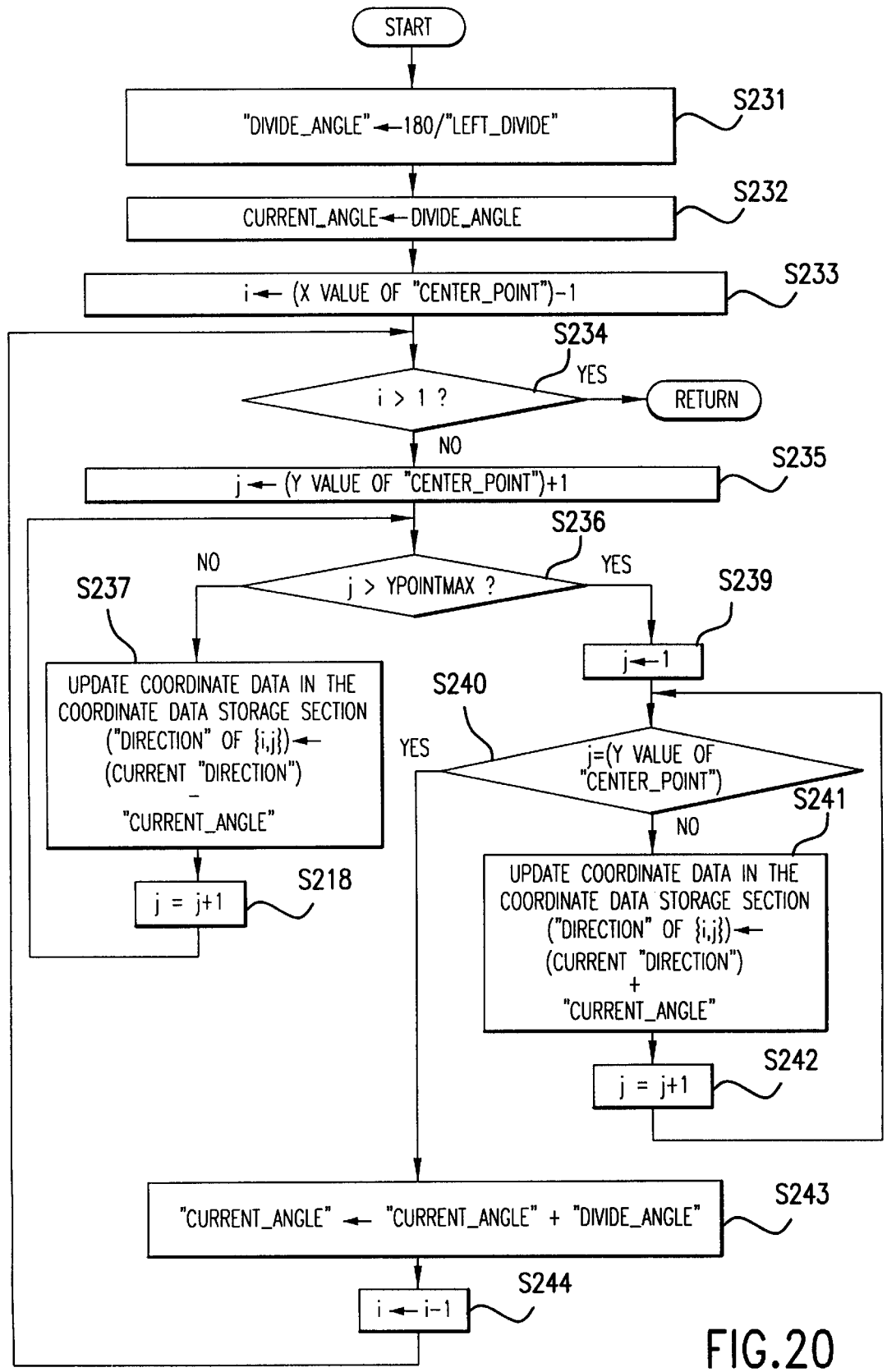

Next, the process of positioning placeable coordinates at the intersections of division lines when the left half of the concentric circles is divided by the value of the variable "left_divide" and the concentric circles will be discussed with reference to FIG. 20. When the process is started, first at step 231, the value of the variable "left_divide" provided previously at step 194 is used to calculate (180/left_divide), and the result is assigned to variable "divide_angle".

Next, at step 232, the value of the variable "divide_angle" is assigned to variable "current_angle". Next, at step 233, one is subtracted from the X value of the coordinate point "center_point" of the argument and the result is assigned to variable i. It is checked whether or not the variable i is less than 1 at step 234. If the variable i is less than 1, the control returns as it is.

Meanwhile, if the variable i is not less than 1 at step 234, control goes to step 235 at which one is added to the Y value of the coordinate point "center_point" of the argument and the result is assigned to variable j. It is checked whether or not the variable j is greater than "YPOINTMAX" at step 236. If the variable j is equal to or less than "YPOINTMAX", the control goes to step 237 at which the coordinate data in the coordinate data storage section is updated so that the "direction" value of attribute values indicating the position of placeable coordinates with coordinates ID {i, j} is set to the value of "current_angle" subtracted from the current "direction" value. At step 238, the variable j is incremented and control returns to step 236. Then, the process starting at step 236 is repeated.

Meanwhile, if the variable j is greater than "YPOINTMAX" at step 236, control goes to step 239 and one is assigned to the variable j for resetting. Next, at step 240, it is checked whether or not the value of the variable j matches the Y value of the coordinate point "current_point" of the argument. If it does not match, control goes to step 241 at which the coordinate data in the coordinate data storage section is updated so that the "direction" value of attribute values indicating the position of placeable coordinates with coordinate ID {i, j} is set to the value of "current_angle" added to the current "direction" value. At step 242, the variable j is incremented and control returns to step 240. The process starting at step 240 is repeated.

Meanwhile, if the value of the variable j matches the Y value of the coordinate point "current_point" of the argument at step 240, control goes to step 243 at which the result of adding the value of the variable "divide_angle" to the value of the variable "current_angle" is assigned to the variable "current_angle". At step 244, the variable i is decremented and control returns to step 234. The process starting at step 234 is repeated. If the variable i is less than 1, control returns at step 234.

Rule 4 is a rule for rotating the entire composition by an arbitrary angle with an arbitrary point as the center. Rule 4 (rule_4 (center_point, plus_angle)) rotates all coordinate points clockwise by the value of the argument "plus_angle" with the coordinate point of the argument "center_point" as the rotation center_point. Rule 4 is described as below.

```
rule_4(center_point, plus_angle)
{
    reset_reference(center_point);
    for (i=1; XPOINTMAX; i++) {
        for (j=1; YPOINTMAX; j++) {
            p=point_data(i,j);
            p->position->angle += plus_angle;
        }
    }
}
```

Figure 21:
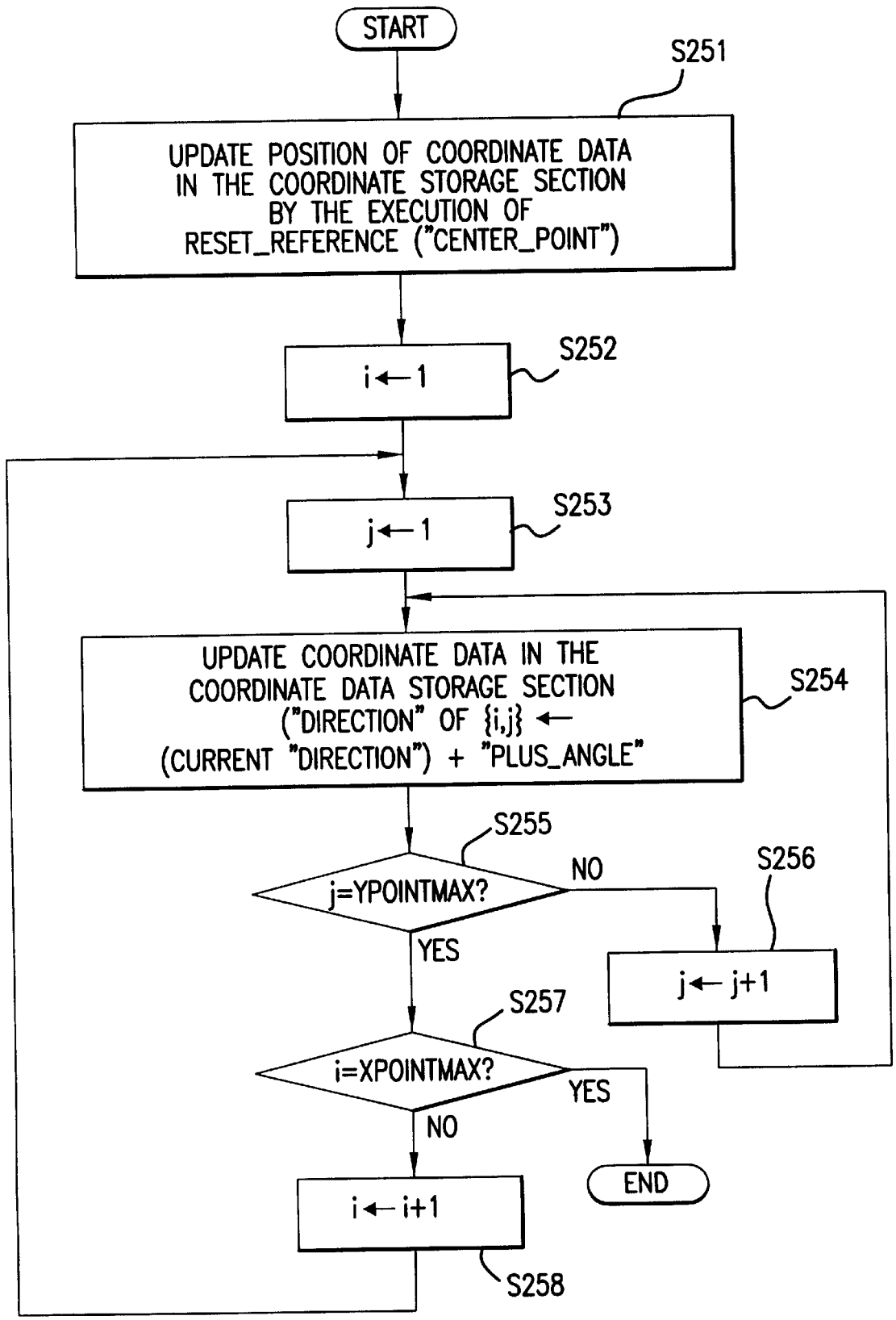
FIG. 21 is a flowchart illustrative of the procedure of rule 4 stored in direction and distance setting rule storage section 104.

FIG. 21 shows a flowchart of the operation executed according to rule 4. The processing according to rule 4 will be discussed with reference to the flowchart shown in FIG. 21. When processing is started, first at step 251, system-defined function "reset_reference" is executed with the argument as the value of variable "center_point" for updating the value indicating the position of coordinate data in the coordinate data storage section. Next, one is assigned to variable i at step 252, and one is assigned to variable j at step 253.

Next, at step 254, the coordinate data in the coordinate data storage section is updated so that the "direction" value of values indicating the position of placeable coordinates with coordinate ID {i, j} is set to the value of the argument "plus_angle" added to the current direction value. Next, at step 255, it is checked whether or not the variable j is equal to "YPOINTMAX". If the variable j is not equal to "YPOINTMAX", then control goes to step 256 and the variable j is incremented. Control returns to step 254. The process starting at step 254 is repeated.

Meanwhile, if the variable j is equal to "YPOINTMAX" at step 255, control goes to step 257 and it is checked whether or not the variable i is equal to "XPOINTMAX". If the variable i is not equal to "XPOINTMAX", then control goes to step 258 and the variable i is incremented. Control returns to step 253. The process starting at step 253 is repeated. If the variable i is equal to "XPOINTMAX" at step 257, the process is terminated.

In the above-described description of rules, the function point_data ({i, j}) is a system-defined function and returns a pointer for accessing coordinate data whose coordinate ID is {i, j}. It can be used to reference the attribute values of coordinate data like p→position→angle, or assign them. The "XPOINTMAX" and "YPOINTMAX" are macros indicating the maximum values of X and Y values of placeable coordinates. The function reset_reference ({i, j}) is a system-defined function for setting the coordinate ID of coordinates used as a position setting reference point to {i, j} and expanding concatenation of measurement objects from the coordinates like a tree. As the measurement objects are changed, the distance and direction are set appropriately so that coordinate placement remains the same as that before the function is applied. The measurement object with coordinate ID {l, m} is set as follows.

When l<i and m<j, the "measurement object" has coordinate ID set to {l+1, m};

When l>i and m=j, the "measurement object "has coordinate ID set to {l-1, m};

When m>j, the "measurement object" has coordinate ID set to {l, m-1};

When m<j, the "measurement object" has coordinate ID set to {l, m+1}.

The system-defined functions and macros are defined by the coordinate data change section 121 described later.

[Color setting rule storage section 105]

The color setting rule storage section 105 stores rules concerning the color arrangement of the drawing element. In this embodiment, the rules are stored according to a table which lists the correspondences between the L*a*b* values which is set to the attribute "color" of the drawing element and words representing the color, such as red and blue.

[Form setting rule storage section 106]

The form setting rule storage section 106 stores rules concerning the form of the drawing element. In has a table which lists the correspondences between the Postscript program set to the attribute "form" of the element and words representing the form, such as column and arrowhead. A criterion is provided for the size of the image described in each PostScript program. Here, the image size is defined as the size falling within a square of 144×144 points (namely, two inches square). The actual size of each drawing element is determined by enlarging or reducing the square in accidence with the grid spacing of input paper and the selected rule.

The image used as an arrow element described in each PostScript program is defined as an upward arrow. The actual arrow direction of each arrow element is defined by rotating the image in accordance with the selected rule.

[Drawing guide option storage section 107]

The drawing guide option storing section 107 stores options of drawing guides. In this embodiment, the drawing guide is represented by a set of ID, character string and image (bitmap data). The ID is used for each section to uniquely identify each drawing guide, and is represented by a string "DG" indicating a drawing guide, followed by a unique positive value, such as DG3. The character string and image are a word or words and a drawing figure for enabling the user to distinguish the drawing guide from others; they show the features of the drawing to be prepared.

In this embodiment, the drawing guides prepared as the options are classified according to the three points, namely, "purpose of drawings", "use of drawings" and "view of drawings". This classification is useful to make the retrieval of the desired drawing guide by the user easy.

Figure 3:
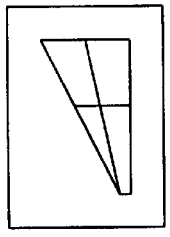
FIG. 3 illustrates a data structure of the drawing guide option storage section 107 in the embodiment.
Figure 3:
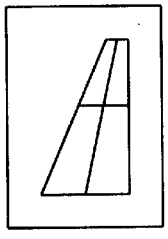
Figure 3:
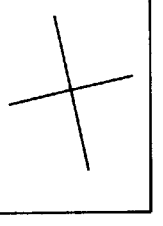

In this embodiment, options of the drawing guide are stored as data in a table format. FIG. 3 shows an example of the data.

[Option-to-setting rule correspondence storage section 108]

The option-to-setting rule correspondence storage section 108 stores the correspondences of the drawing guides stored in the drawing guide option storage section 107, rules stored in the direction and distance setting rule storage section 104, words stored in the color setting rule storage section 105 and words stored in the form setting rule storage section 106 and words. In this embodiment, the correspondences are stored by using data in the table format relating the drawing guide IDs to rule names and values of the argument to the rule, and to words representing forms and colors. When the arguments are determined at the time of the selection of the drawing guide, reserved words indicating the matter are stored instead of the actual values.

FIG. 4 shows an example of the data based on the example shown in FIG. 3. Each row associates the drawing guide ID with the direction and distance setting rule, the color setting rule, and the form setting rule. The words are associated with each element type so that different coloring and form can be taken for each element type for one color setting rule or form setting rule. The reserved word "_calculate" indicates to calculate the length of the drawing to fit the size of the printing medium. The reserved word "_fill_point" indicates that the arbitrary grid point is inputted by the user.

[Drawing guide selection section 109]

This drawing guide selection section selects one from among options stored in the drawing guide option storage section 107 in response to the user's command, and stores the result of selection. If the selected drawing guide can take variable values, this section specifies the values. Further, it has a function of responding to inquiries from other functional sections with the result of selection.

Figure 5:
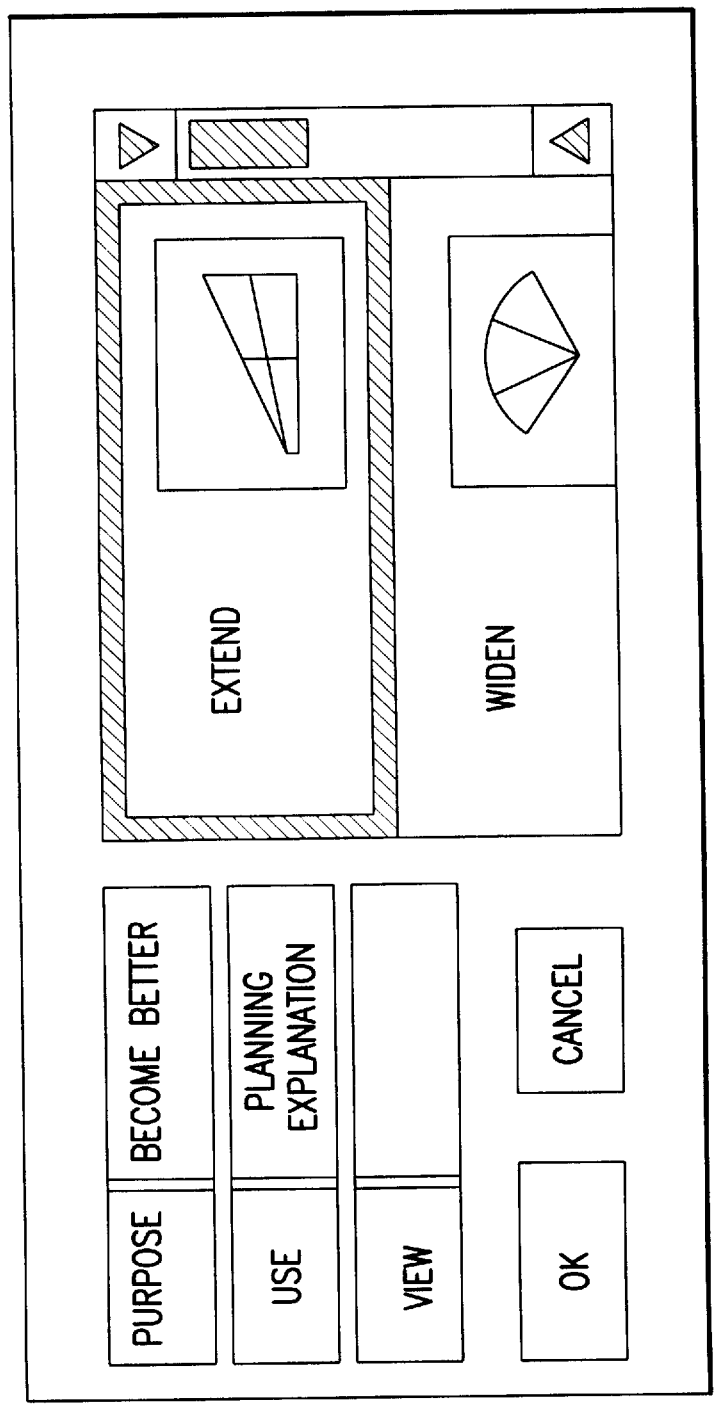
FIG. 5 illustrates a drawing guide selection screen provided by the drawing guide selection section 109 in the embodiment.

In this embodiment, according to the categories stored in the drawing guide option storage section 107, the drawing guide searched by using each category can be displayed on the screen display section as shown in FIG. 5. If the user selects an item from each category, this section searches the drawing guide option storage section 107 for the drawing guide which has the selected item in the category, and displays character strings and images associated with the found drawing guide on the screen display section 122. If a plurality of drawing guides are found, the plurality of drawing guides is displayed in the lexicon order of the character strings indicating drawing guides. If too many drawing guides are found to display, they are displayed in a window that can be scrolled, as shown in FIG. 5. If no drawing guide that has each item in the category is found, nothing is displayed.

Figure 6:
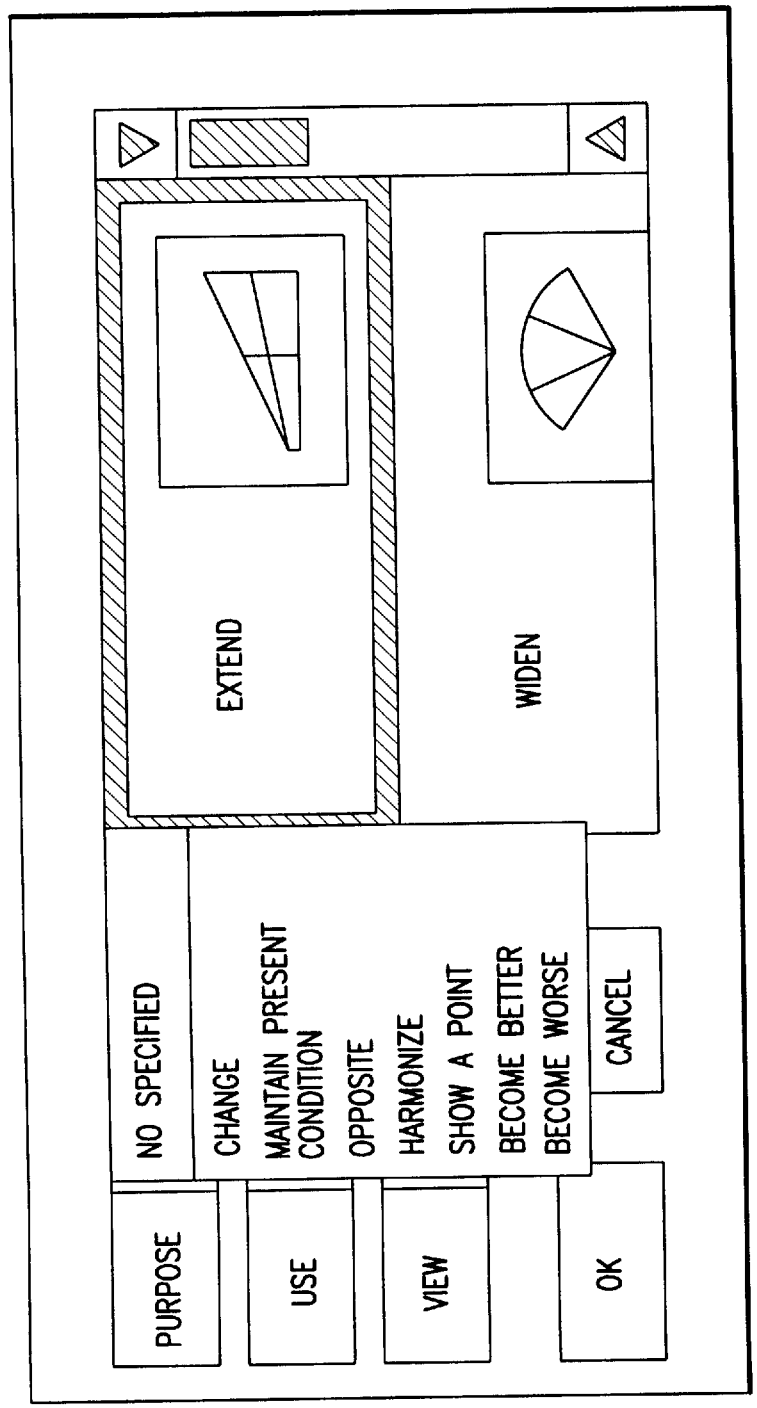
FIG. 6 illustrates the display status on which the selection screen of FIG. 5 is displayed.

The list of the items in the category are displayed as a pop up menu as shown in FIG. 6, and an item is selected from the menu. The menu items consists of "no specified", which indicates that no item is specified, and items of each category in the data stored in the drawing guide option storage section. Except for the "no specified", these items are displayed in the lexicon order. If the plural same items are found, only one of them is displayed. The selected item is displayed with underline.

If the user selects one from among the drawing guides displayed on the screen, that is, selects a pair of the character string and image indicating a drawing guide (the selected one is surrounded by a solid line) and then clicks on the area "OK", this section checks the ID of the selected drawing guide. Then, the rule and the arguments associated with the ID of the selected drawing guide in the option-to-rule correspondence storage section 108 are retrieved, and the retrieved values are passed to the coordinate data change section 121. At that time, if the arguments includes the reserved word indicating that the actual value is to be inputted by the user, the section receives the user's command inputted by the method based on the reserved word. For example, when the reserved word of the argument is _fill_position", the user can input the value in a method such as selecting the point on the original by using a pad.

[Marking operation 110]

This is an drawing operation on input paper 111 to be read through the original read section 112. In the embodiment, color marker pens different in color are used. The colors of the color marker pens, which will be hereinafter called maker colors, are assigned so as to be in a one-to-one correspondence with the drawing elements types of "box", "arrow" and "text". In the embodiment, colors other than white are used as the maker colors.

[Input paper 111]

This input paper 111 has a function of media for preparing drawings to be read through the original read section 112. A grid used to detect the positioning relationships among the drawing elements is printed on the input paper 111. The grid comprises straight lines equally spaced from each other and intersecting at right angles. The color of the grids differs from the marker colors. In the embodiment, the color of the paper is white, and the grid color is a color other than white.

[Original read section 112]

This original read section 112 optically scans an original to be processed, decomposes it into R(red), G(green) and B(blue) of three primary colors of light, generates digital color image data with 256 levels of gray, and stores the generated data in the processed image storage section 113.

Figure 7:
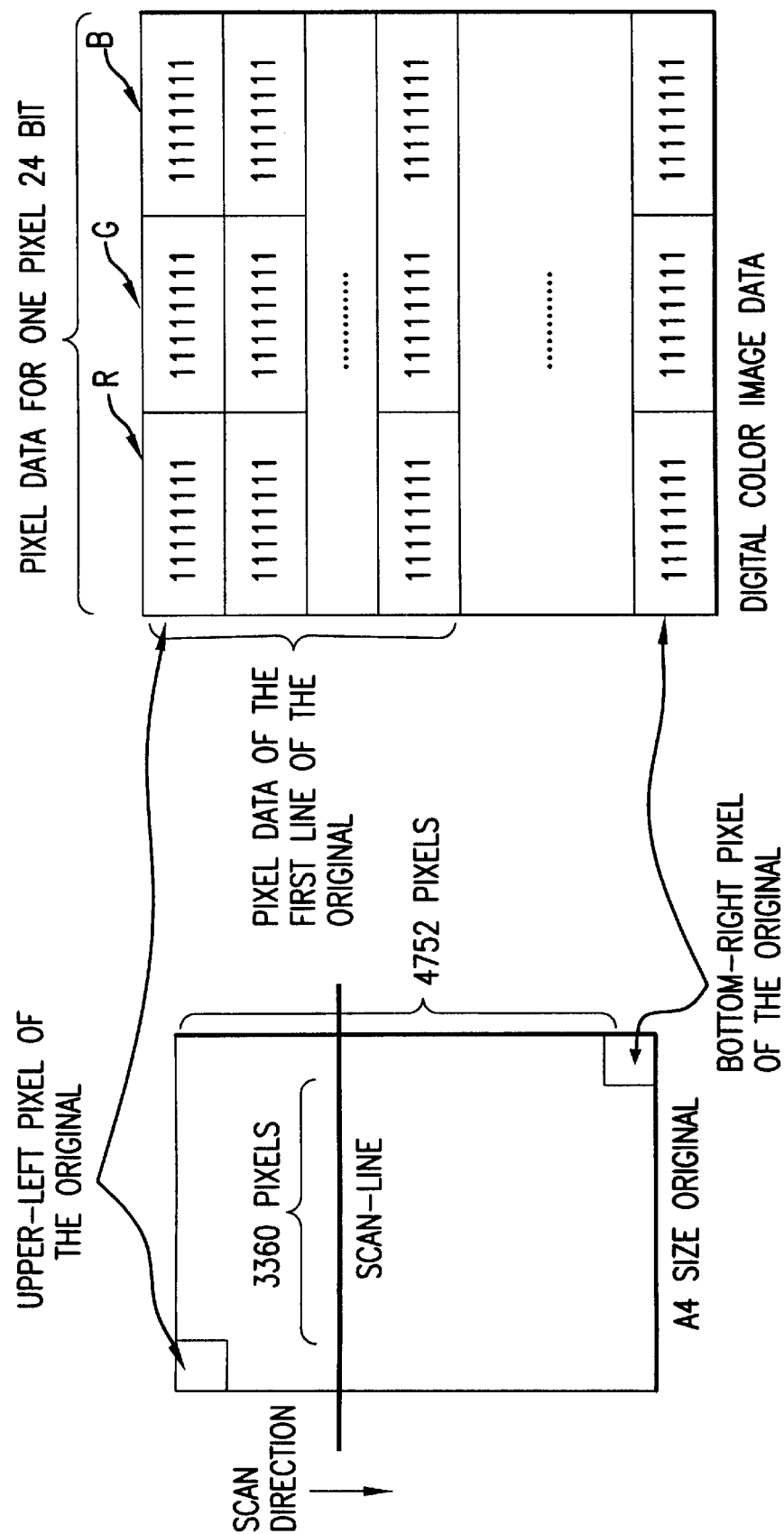
FIG. 7 illustrates an operation of the original reading section 112.

One pixel of the generated digital color image data corresponds to 0.0625 mm square on the original (16×16 pixels per mm$^2$, resolution of about 400 dpi). One pixel data piece is represented by 24 bits (a contiguous sequence of three bytes of data). The first eight bits of the 24 bits indicate 256-level gray scale at of R, the middle eight bits indicate 256-level gray scale of G, and the last eight bits indicate 256-level gray scale data of B. When all bits are set on, white is indicated. When all bits are set off, black is indicated. (See FIG. 7.)

Digital color image data provided by one scan corresponds to one sheet of A4-size paper and is represented as (3360×4752) contiguous pixel data pieces. The pixel data order is uniquely determined from the pixel data positions on the original. It is matched with optical scan of moving a scan line provided by CCDs along the short side direction of the original in the long side direction thereof. Assuming that an A4-size original is placed in portrait orientation, the first to 3360th pixel data pieces correspond to the pixels on the top end of the original arranged in order from left to right and 4752 sets of pixel data pieces each set consisting of 3360 data pieces are arranged in order from top to bottom of the original.

[Processed image storage section 113]

This processed image storage section 113 stores digital color image data to be processed, which will be hereinafter called image to be processed. The data size of an image to be processed is about 46 Mbytes.

[Grid detection section 114]

The grid detection section 114 detects a grid from the image to be processed, and instructs the coordinate data change section 121 to initialize coordinate data in accordance with the detected grid. It also returns information of the grid included in the specific pixel data set in the image to be processed in response to an instruction from other sections. This section previously measures grid color printed on the input paper 111 and stores the conversion result of the color to the pixel data format. It also stores values in the allowable range for the color. The information is used to detect the grid.

One grid line is parallel with or orthogonal to the scan line when an original is input. Therefore, the grid can be extracted if the pixel data matching the grid color (including the allowable value) is checked for address regularity in the data structure of the image to be processed, shown in FIG. 7.

This section can detect the numbers of horizontal and vertical grid points of an original, and grid points spacing in point units. It can also detect the number of grid points included in one pixel data set and vertical or horizontal grid lines included therein.

[Box detection section 115]

The box detection section 114 detects an element whose element type is "box" from the image to be processed, and newly stores information concerning the detected element in the element data storage section 101. The section detects elements in response to the instruction from the processing control section 124. It detects one undetected box element from the image to be processed upon reception of one instruction. If an element is detected, any value other than nil is returned; if no element is detected, nil is returned, as shown in an algorithm described later.

This section previously measures the "box" marker color and stores the conversion result of the color into the pixel data format. It also stores the values in the allowable range for the color. The information is used to detect "box" elements.

This section performs processing according to the following algorithm:

[Step 1] The pixel data of the image to be processed is checked in order starting at the first pixel data piece of the image to be processed (namely, the pixel in the upper-left corner of the original) to see if the color matches the "box" marker color (including the allowable range). If a match is found, the address of the pixel data piece is stored as "contour pixel data addresses". If no match is found, nil is returned and the process is terminated.

[Step 2] An element generation instruction is sent to the element data change section. A value returned therefrom is stored as "new element ID".

[Step 3] The image data to be processed is searched for all pixel data of the "box" marker color concatenated on the original to the pixel data found at step 1 forming a closed curve, and the addresses of the found data are added to the "contour pixel data addresses" for storage.

[Step 4] The image to be processed is searched for all pixel data existing inside the closed curve indicated by the "contour pixel data addresses" on the original, and the addresses of the found data and of the "contour pixel data addresses" are stored as "box area pixel data addresses".

[Step 5] The "box area pixel data addresses" are passed to the grid detection section, which then checks the order of vertical grid lines included in the area indicated by the "box area pixel data addresses" on the original. The result is stored as the "vertical line range".

[step 6] The "box area pixel data addresses" are passed to the grid detection section, which then checks the order of horizontal lines included in the area indicated by the "box area pixel data addresses" on the original. The result is stored as the "horizontal line range".

[Step 7] The grid point which is the nearest to the enter point of the rectangle on the original indicated by the "vertical line range" and "horizontal line range" is found. This grid point is set as the intersection of the Xth vertical line from the left and the Yth horizontal line from the bottom. At this time, the box detection section instructs the element data change section to set the values of the attribute "position" of the element indicated by the "new element ID" to {X, Y}.

[Step 8] The colors of pixel data at "contour pixel data addresses" are all set to white.

[Step 9] As a result, a set of the "new element ID", "vertical line range" and "horizontal line range" is returned, and the processing of this section is terminated.

[Arrow detection section 116]

The arrow detection section 116 detects an element whose element type is "arrow" from the image to be processed, and newly stores information concerning the detected element in the element data storage section 101.

This section detects elements in response to an instruction from the processing control section. It detects one undetected arrow element from the image to be processed upon reception of one instruction. If an element is detected, any value other than nil is returned; if no element is detected, nil is returned, as shown in an algorithm described later. This section previously measures the color of the "arrow" marker and stores the conversion result of the color into the pixel data format. It also stores the values in the allowable range for the color. The information is used to detect "arrow" elements.

This section performs a processing according to the following algorithm.

[Step 1] The image to be processed is searched in order starting at the first pixel data for the pixel data of the image to be processed (namely, the pixel in the upper-left corner of the original) whose color matches the "arrow" marker color (including the allowable range). If a match is found, the address of the pixel data is stored as "contour pixel data addresses". If no match is found, nil is returned and the process is terminated.

[Step 2] The arrow detection section passes a drawing element generating instruction to the element data change section 102 and stores a value returned therefrom as "new element ID".

[Step 3] The image to be processed is searched for all pixel data of the "arrow" maker color concatenated on the original to the pixel data found at step 1 forming a line. The addresses of the found pixel data are added to the "contour pixel data addresses" for storage.

[Step 4] The image to be processed is searched for all pixel data corresponding to the minimum rectangle including the line indicated by the "contour pixel data addresses" on the original. Addresses of the found pixel data are stored as "arrow area pixel data addresses".

[Step 5] The "arrow area pixel data addresses" are passed to the grid detection section 114, which then checks the order of vertical grid lines included in the area indicated by the "arrow area pixel data addresses" on the original. The result is stores as "vertical line range".

[Step 6] The "arrow area pixel data addresses" are passed to the grid detection section 114, which then checks the order of horizontal grid lines entering the area indicated by the "arrow area pixel data addresses" on the original. The result is stored as horizontal line range".

[Step 7] The arrow detection section finds a grid point which is the nearest to the center_point of the rectangle on the original indicated by the "vertical line range" and "horizontal line range", and sets the grid point as the intersection of the Xth vertical line from the left and the Yth horizontal line from the bottom. At this time, it instructs the element data change section 102 to set the values of the attribute "position" of the element indicated by the "new element ID" to {X, Y}.

[Step 8] The direction in which the arrow is oriented is checked in accordance with the "contour pixel data addresses". At first, the arrow detection section finds the arrowhead, namely pixel data with the line branching to three lines on the original. Next, it finds the longest one of the three branch lines. The arrow mark direction is found from the address patterns of the pixel data forming the line, and the arrow direction is found based on which end point of the line the arrowhead is at. The result is stored as "arrow direction". The criteria for the arrow directions are the same as those for the coordinate data directions.

[Step 9] The colors of all pixel data indicated by the "contour pixel addresses" are set to white.

[Step 10] As a result, a set of the "new element ID", "vertical line range", "horizontal line range" and "arrow direction" are returned, and the processing is terminated.

[Text detection section 117]

The text detection section 117 detects a element whose element type is "text" from the image to be processed, and stores the information concerning the detected element in the element data storage section 101. The section detects elements in response to the instruction from the processing control section 124. It detects one undetected text element from the image to be processed upon reception of one instruction. If an element is detected, any value other than nil is returned; if no element is detected, nil is returned, as shown in an algorithm described later.

The section 117 previously measures the "text" marker color and stores the conversion result of the color into the pixel data format. It also stores the values in the allowable range for the color. The information is used to detect text elements.

The section performs a processing in accordance with the following algorithm.

[Step 1] The image to be processed is searched in order starting at the first pixel data for the pixel data of the image to be processed (namely, the pixel in the upper-left corner of the original) whose color matches the "text" marker color (including the allowable range). If a match is found, the address of the found pixel data is stored as "contour pixel data addresses". If no match is found, nil is returned and the process is terminated.

[Step 2] A drawing element generating instruction is passed to the element data change section 102. A value returned therefrom is stored as "new element ID".

[Step 3] The image to be processed is searched for all pixel data of the "text" maker color concatenated on the original to the pixel data found at step 1 forming a line. The addresses of the found pixel data are added to the "contour pixel data addresses" for storage.

[Step 4] The image to be processed is searched for pixel data having the "text" marker color. If it is found, control goes step 5; otherwise, control goes step 6.

[Step 5] The image to be processed i searched for all pixel data concatenated on the original to the pixel data found at the step 4 forming a line. The addresses of found pixels are added to the "contour pixel data addresses" for storage. Then, the control is returned to step 4.

[Step 6] The image to be processed is searched for all pixel data corresponding to the minimum rectangle including the "contour pixel data addresses" on the original. The addresses of found pixels are stored as "text area pixel data addresses".

[Step 7] The "text area pixel data addresses" are passed to the grid detection section 114, which checks the order of vertical grid lines included in the area indicated by the "text area pixel data addresses" on the original. The result is stored as "vertical line range".

[Step 8] The "text area pixel data addresses" are passed to the grid detection section 114, which checks the order of horizontal grid lines entering the area indicated by the addresses on the original. The result is stored as "horizontal line range".

[Step 9] The text detection section finds a grid point which is the nearest to the center point of the rectangle on the original indicated by the "vertical line range" and "horizontal line range", and sets the grid point as the intersection of the Xth vertical line from the left and the Yth horizontal line from the bottom. At this time, it instructs the element data change section 102 to set the values of the attribute "position" of the element indicated by the "new element ID" to {X, Y}.

[Step 10] The text detection section generates image data such that only the image in the portion indicated by the "text area pixel data addresses" is copied from the image to be processed. Pixel colors are changed so that the pixels in the portion corresponding to the text set to black and that other pixels are set to white in the generated image data. This section instructs the element data change section to set the pixel data after the change to the value of the "text" attribute of the element indicated by the "new element ID".

[Step 11] The colors of all pixel data indicated by the "contour pixel addresses" are set to white.

[Step 12] As a result, the "new element ID" is returned, and the processing is terminated.

[Color setting section 118]

The color setting section sets the colors of drawing elements in accordance with the element type and the selected drawing guide in response to the instruction from the other sections. Arguments of the setting instruction are table ID in the element data storage section and element type.

This section performs a processing according to the following algorithm.

[Step 1] The table ID and element type passed as arguments are stored as "new element ID" and "new element type", respectively.

[Step 2] The drawing guide ID selected by the user is inquired of the drawing guide selection section 109. The answer to the inquiry is stored as "drawing guide ID".

[Step 3] The information stored in the option-to-setting rule correspondence storage section 108 is searched for a color setting rule which is associated with the "drawing guide ID" and whose element type is "new element type". The found color setting rule is stored as "color application rule".

[Step 4] The information stored in the color setting rule storage section is searched for a value of L*a*b* associated with the "color application rule". The color setting section instructs the element data change section 102 to set the found value of L*a*b* to the attribute "color" of the drawing element of the "new element ID".

[Form setting section 119]

The form setting section 119 sets the form of the drawing element in accordance with the element type and the selected drawing guide in response to instructions from the other sections. The arguments of the setting instruction consist of the table ID in the element data storage section 101, the element type, the number of horizontal grid points, and the number of vertical grid points. The number of horizontal grid points indicates how many vertical grid lines are included in the drawing element for which value is to be set on the original. That is, it is the value that can be obtained from the "vertical line range" returned by the box detection section 115 or the arrow detection section 116 as the detection result. The number of vertical grid points indicates how many horizontal grid lines are included in the drawing element for which value is to be set on the original. That is, it is the value that can be obtained from the "horizontal line range" returned by the box detection section 115 or the arrow detection section 116 as the detection result.

This section performs a processing according to the following algorithm.

[Step 1] The table ID, the element type, the number of horizontal grid points, and the number of vertical grid points passed as arguments are stored as "new element ID", "new element type", "X count", and "Y count", respectively.

[Step 2] The ID of the drawing guide selected by the user is inquired of the drawing guide selection section 109, and the answer therefrom is stored as "drawing guide ID".

[Step 3] The information stored in the option-to-setting rule correspondence storage section 108 is searched for the form setting rule which is associated with the "drawing guide ID" and whose element type is "new element type". The found form setting rule is stored as "form application rule".

[Step 4] The form setting section searches information stored in the form setting rule storage section 106 for a PostScript program which is associated with the "form application rule", and instructs the element data change section 102 to set the found PostScript program to the attribute "form" of the element "new element ID".

[Step 5] If the "X count" is not 1, a change instruction is sent to the element data change section 102 to enlarge the horizontal length of the image indicated by the element "new element ID" by a magnification of the "X count" multiplied by 100 (in percent units).

[Step 6] If the "Y count" is not 1, a change instruction is sent to the element data change section 102 to enlarge the vertical length of the image indicated by the element "new element ID" by a magnification of the "Y count" multiplied by 100 (in percent units).

[Direction change section 120]

The direction change section 120 changes the arrow direction of the arrow element in accordance with the arrow direction on the original and selected drawing guide in response to instruction from the other sections.

The arrow element is set upward on an output image by the form setting section 119 from definition of the form setting rule. The direction change section 120 changes the arrow direction appropriately after the arrow direction is set by the form setting section 119.

Augments of the setting instruction consists of table ID in the element data storage section and an arrow direction on the original. Here, the arrow direction on the original is the value of the "arrow direction" that is returned by the arrow detection section 116 as the detection result. The value indicates the angle which the arrow direction forms clockwise with the upward direction on the original as 0 degrees.

The direction change section 120, at first, instructs the element data change section 102 to rotate the arrow element indicated by the table ID passed as the argument at the angle of the arrow direction on the original. Next, it checks the placeable coordinates, which indicates the position of the element. Here, If directions of the four coordinate points adjacent to this coordinate point are distorted, that is, the four adjacent coordinate points are not exist in the direction of 0 degrees, 90 degrees, 180 degrees and 270 degrees, the arrow direction is changed in accordance with the distortion.

[Coordinate data change section 121]

The coordinate change section 121 initializes the coordinate data in the coordinate data storage section 103 in response to the instructions sent from the grid detection section 114. This section also change the coordinate data stored in the coordinate data storage section by using the rules stored in the direction and distance rule storage section 104 in response to the instruction sent from the drawing guide selection section 109.

This section stores macros and system defined functions, such as reset_reference( ) described above, and uses them to interpret the rule. The arguments of the initialization instruction are the number of horizontal grid points on the original, the number of vertical grid points on the original, and the spacing between the grid points (in the point units). When the initialization is instructed, this section first stores the number of horizontal grid points on the original and the number of vertical grid points on the original as XPOINTMAX and YPOINTMAX, respectively. Next, it generates the (XPOINTMAX×YPOINTMAX) placeable coordinate data pieces in the coordinate data storing section. Then, it assigns the unique coordinate IDs {1, 1} to {XPOINTMAX, YPOINTMAX} to the coordinate data pieces. Last, to initialize the direction and distance of the coordinate data, it executes the procedure reset_reference ({1, 1}), then executes the procedure rule__1( ) with the passed grid point spacing as the argument.

Figure 8:
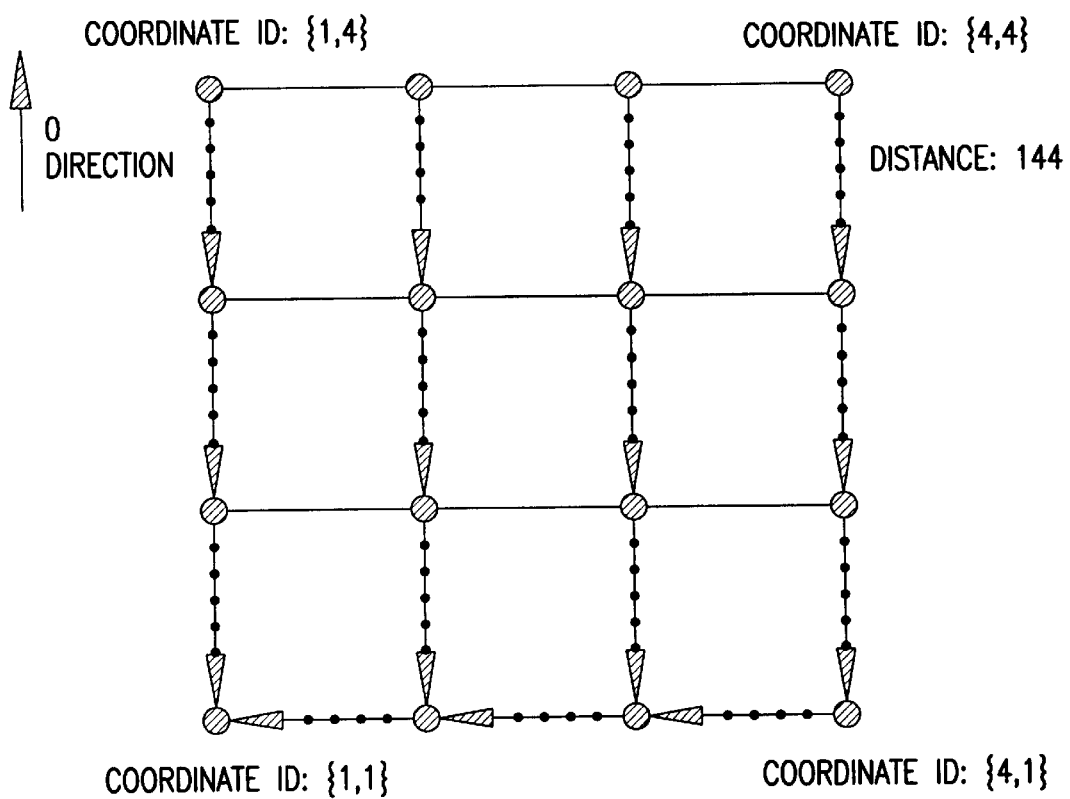
FIG. 8 illustrates an example which the coordinates are changed according to rule 1 by the coordinate data change section 121.

For example, if an initialization instruction is given with the number of horizontal grid points of the original as 4, the number of vertical grid points of the original as 4, and the grid point spacing as 144, the coordinate data change section sets the coordinate layout as shown in FIG. 8.

Figure 9:
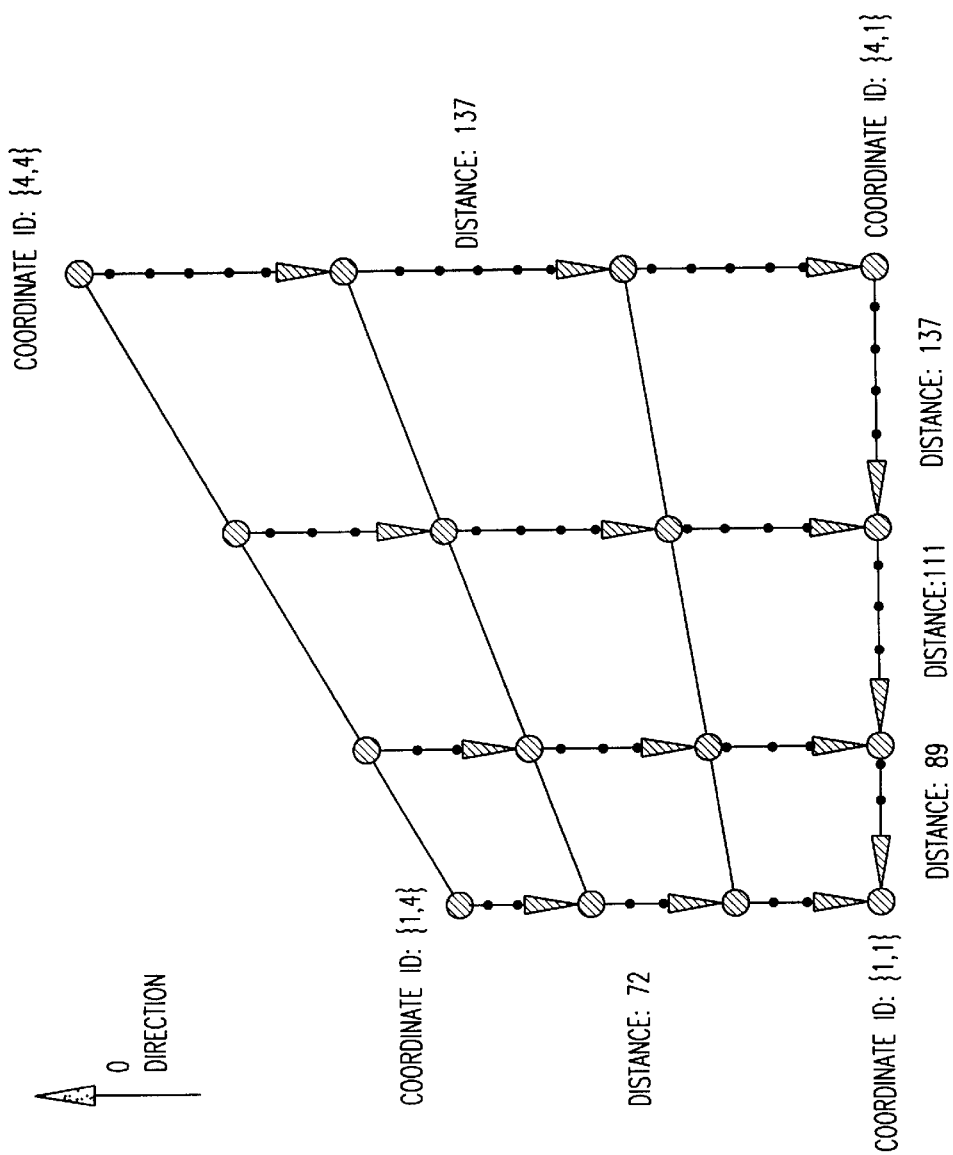
FIG. 9 illustrates an example which the coordinates are changed according to rule 2 by the coordinate data change section 121.

When the coordinate layout is set as shown in FIG. 8, if the other section instructs to execute the procedure rule_2 (7.2, 1) to change the coordinate data, the coordinate data change section sets the coordinate layout as shown in FIG. 9.

Figure 10:
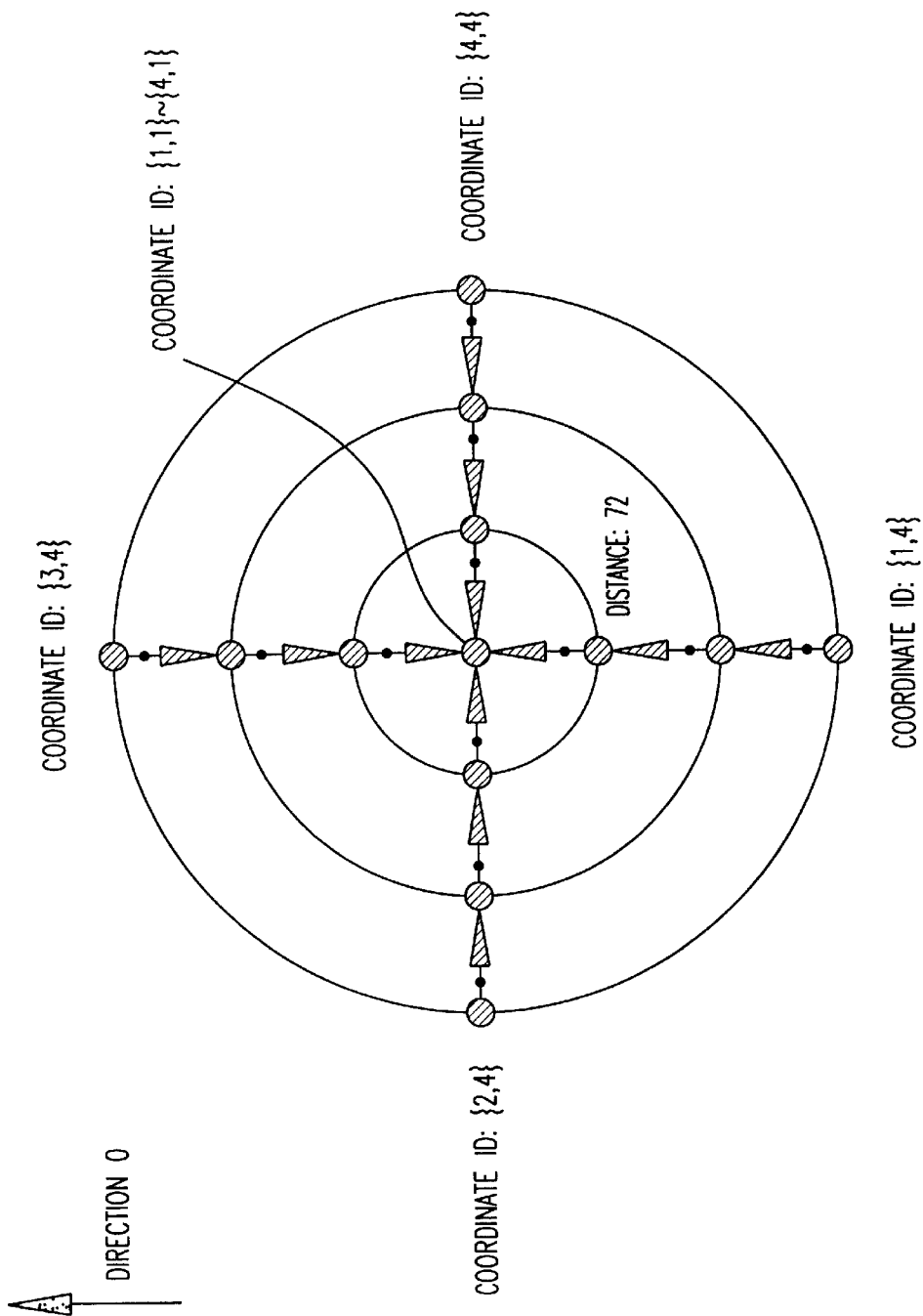
FIG. 10 illustrates an example which the coordinates are changed according to rule 3 by the coordinate data change section 121.
Figure 11:
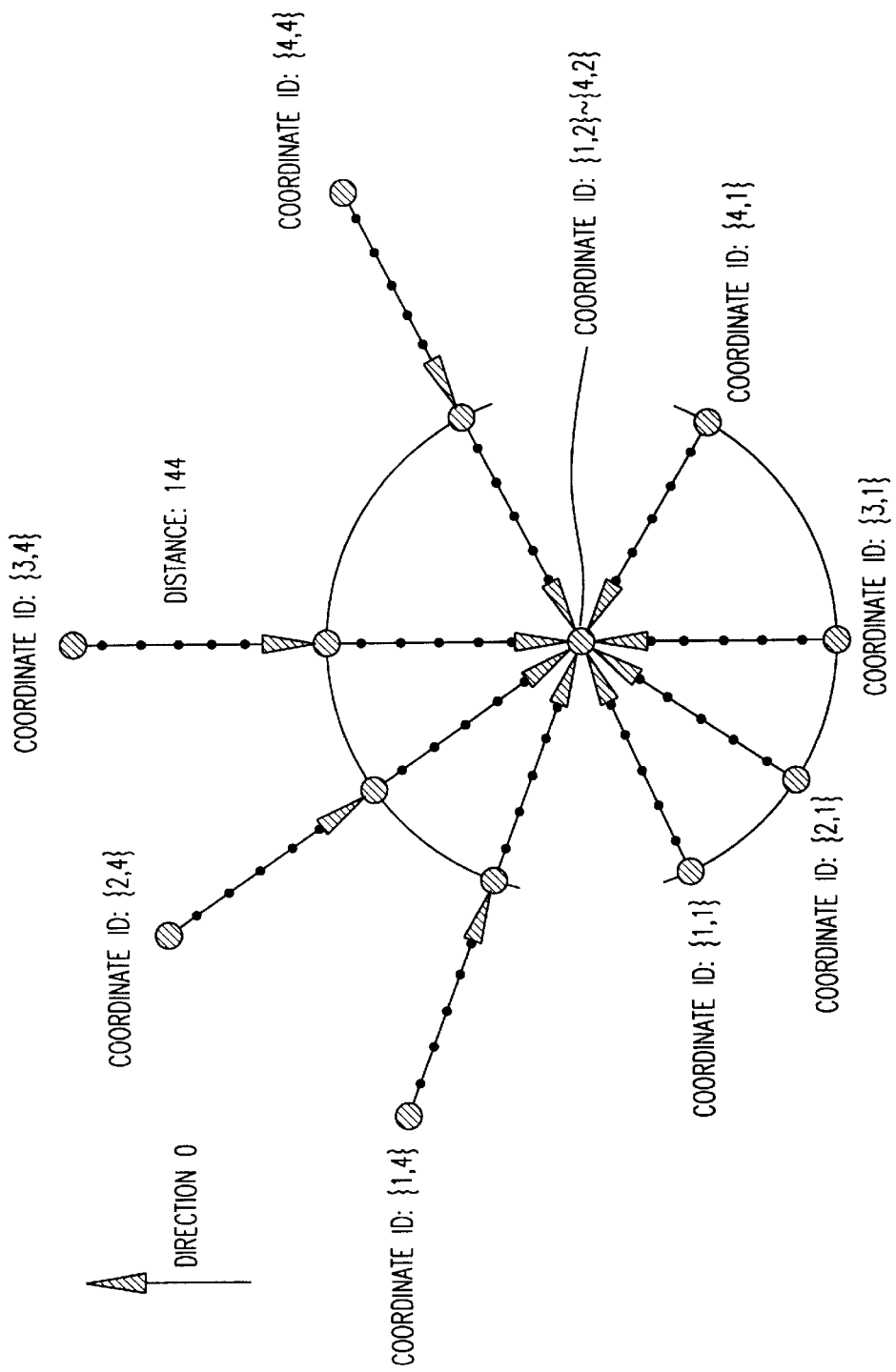
FIG. 11 illustrates another example which the coordinates are changed according to rule 3 with different argument by the coordinate data change section 121.

If the other section instructs to execute the procedure rule_3({3, 1}, 72) to change the coordinate data, the coordinate data change section sets the coordinate layout as shown in FIG. 10. If the procedure rule_3({3, 1}, 72) is instructed, this section sets the coordinate layout as shown in FIG. 11.

[Screen display section 122]

The screen display section 122 displays option and messages to prompt inputting values, etc., on the screen in response to commands and selection described above.

[Drawing print section 123]

The drawing print section 123 interprets element data stored in the element data storage section 101, converts the data into a CMYK raster image, and prints the converted image on paper or an OHP sheet, in response to the user's command. When it draws drawing elements, the drawing elements are overwritten on each other in the ascending order of the values of the attribute display order. It also draws the drawing element so that direction 0 is always oriented upward on paper or an OHP sheet. If one element has values of attribute "text", first the element is drawn in accordance with the attributes "color" and "form", then the text is overwritten in accordance with the value of the attribute "text".

[Processing control section 124]

The processing control section 124 controls the entire flow of processing. Also, this section receives commands to start and end the whole system from the user.

Figure 12:
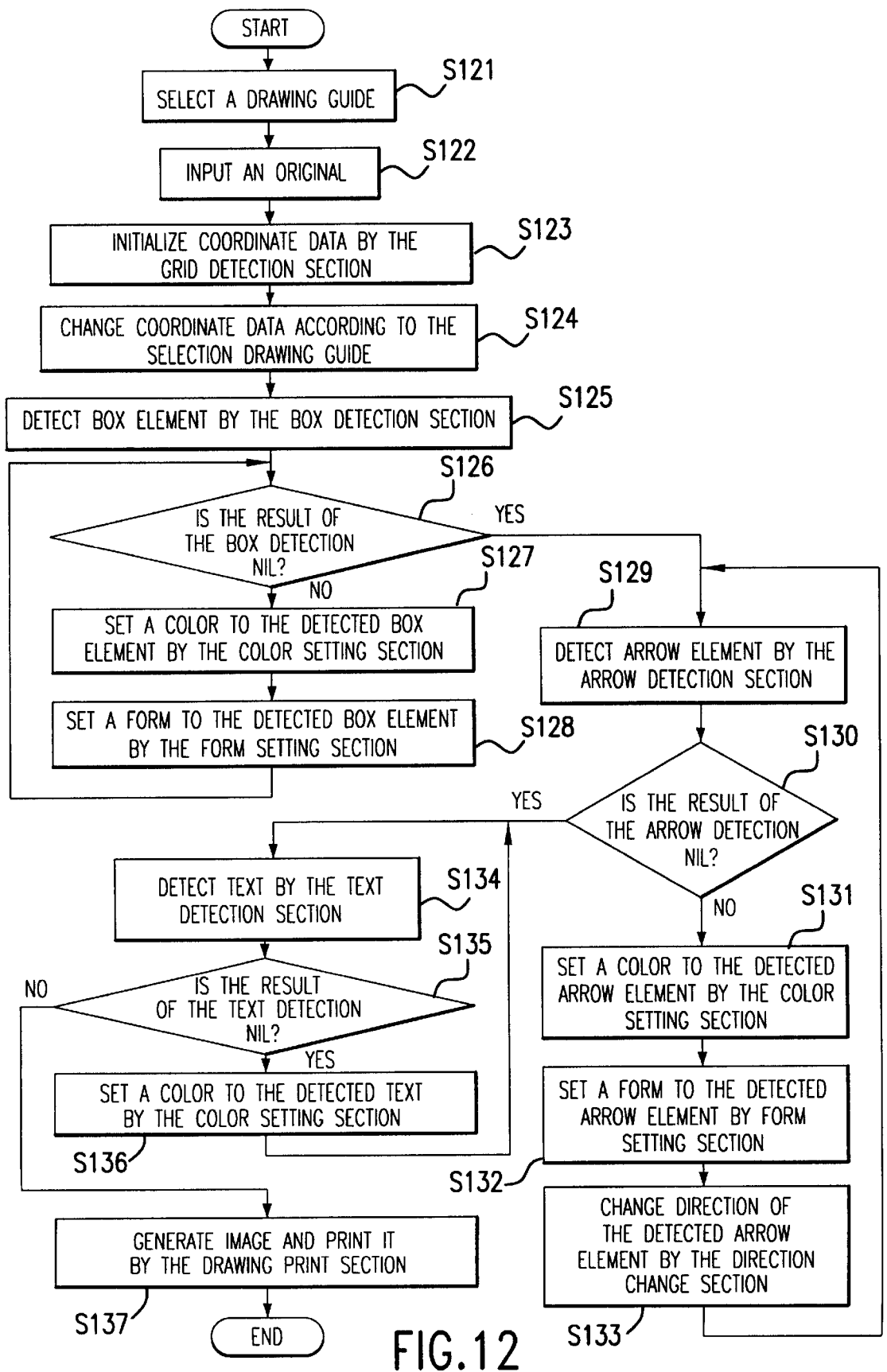
FIG. 12 is a flowchart illustrative of the procedure of the processing control section 124.

FIG. 12 shows a flowchart of the whole processing in the embodiment. The processing control section 124 controls and performs this processing flow. In FIG. 12, first when the user selects a drawing guide and enters a rough sketch drawn on the input paper at steps S121 and S122, the grid detection section 114 detects a grid, initializes coordinate data at step 123, and changes the coordinate data in accordance with the selected drawing guide at step 124. Next, each time the box detection section 115 detects a box, the color and form of the detected box are set at steps S125, S126, S127 and S128. Next, each time the arrow detection section 116 detects an arrow, the color, form and direction of the detected arrow are set at steps S129, S130, S131, S132 and S133. Next, each time the text detection section 117 detects a text, the color of the detected text is set at the steps S134, S135 and S136. Last, the drawing print section 123 generates an image and prints it at step 137.

Figure 13:
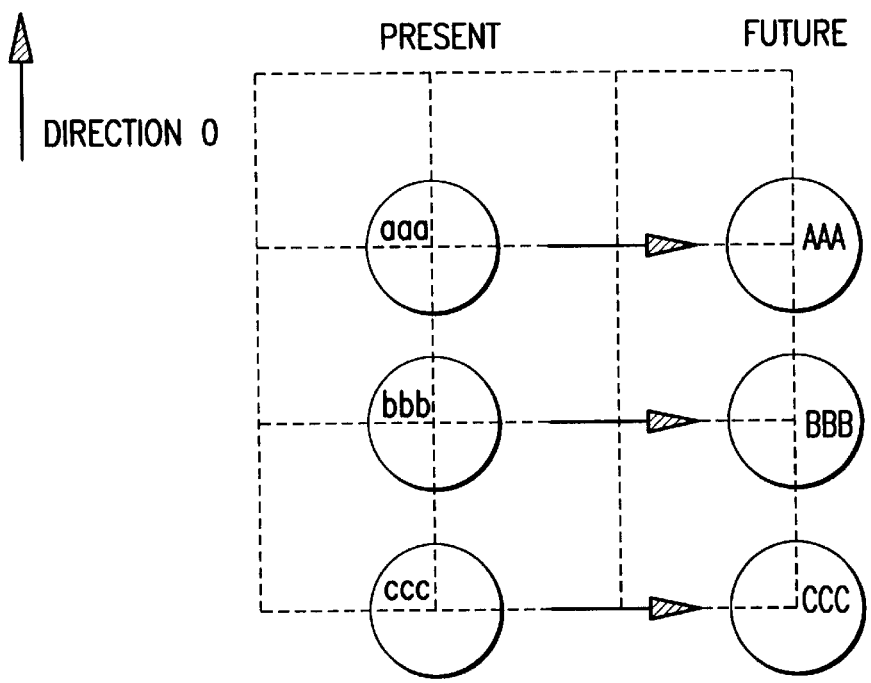
FIG. 13 illustrates a rough of original picture drawn on a input paper used in the embodiment.
Figure 14:
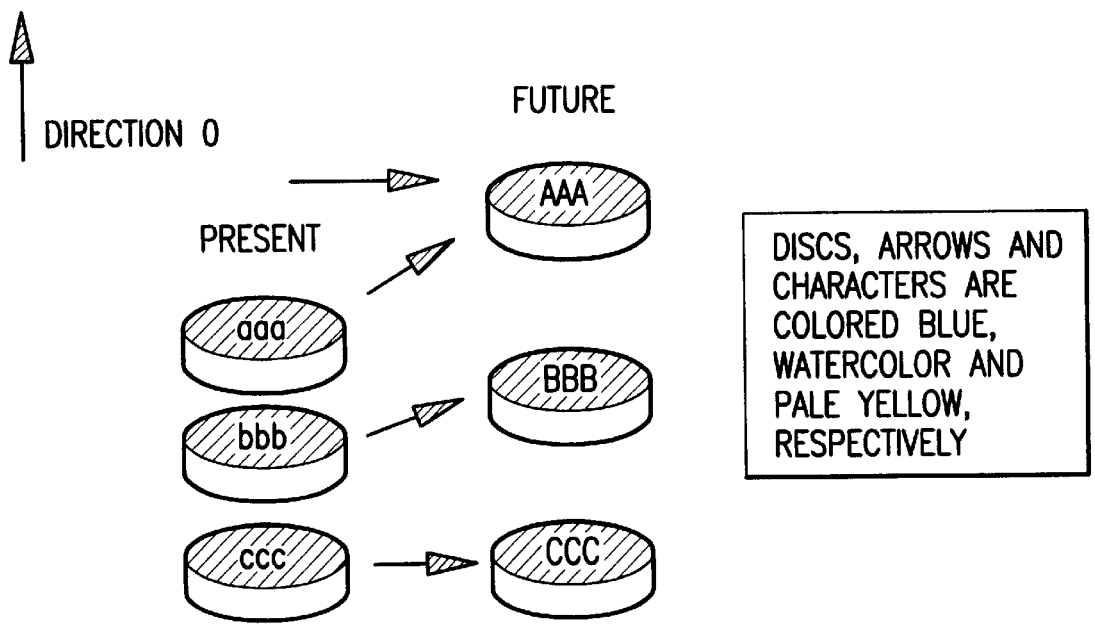
FIG. 14 illustrates a design of the drawing generated by using the input paper shown in FIG. 13 and being applied the drawing guide "extend"

In the embodiment, if the user selects "extend" as drawing guide and enters an input paper shown in FIG. 13, an image shown in FIG. 14 is generated. The drawing shown in FIG. 14 has an impression of "extend" and becomes attractive.

In the embodiment described above, although the user specifies drawing elements and positioning relation of the elements by using the input paper on which rough sketch is drawn, the user can specify drawing elements and positioning relation of the elements by using the other methods. For example, they can be specified by using a digitizer, or by previously preparing patterns of element combinations and positioning relation and selecting one of the patterns and parameters, such as the number of elements.

As described above, in this invention, by a simple specification of elements, positioning relation among them, and rules of drawing, such as drawing guides, an attractive drawing can be generated. Particularly, when the user specifies drawing elements and positioning relation among them by using an input paper on which the user draw a rough sketch, an attractive drawing can be generated by an extremely simple operations.

What is claimed is:

1. A drawing system comprising:

reading means for reading a picture drawn on a medium, to generate image information used for instruction;

detecting means for detecting a drawing element which is included in the drawing to be created and a positioning relation of said one drawing element and another drawing element from said image information used for instruction;

specifying means for specifying a drawing rule which is applied to the drawing to be created; and image generating means for generating image information representing the drawing to be created in accordance with said detecting means and said specifying means.

2. The drawing system of claim 1, wherein said reading means optically reads said picture drawn on a medium.

3. The drawing system of claim 2, wherein said detecting means determines a type of said detected one drawing element in accordance with a color of said picture drawn on the medium.

4. The drawing system of claim 3, wherein said detecting means determines the type of said detected drawing element as one of a box, an arrow and a text.

5. The drawing system of claim 1, wherein said specifying means comprises at least one of:
  positioning relation specifying means for specifying a drawing rule concerning the positioning relation of said one drawing element and the other drawing element;
  shape specifying means for specifying a drawing rule concerning a shape of said one drawing element;
  color specifying means for specifying a drawing rule concerning a color of said one drawing element.

6. The drawing system of claim 5, further comprising:

point storing means for storing a plurality of points on each of which the drawing element included in the drawing to be created is placed with an identifier to uniquely identify each point;

and wherein
  said detecting means specifies said positioning relation by associating an appropriate one of said points stored in said point storing means with the drawing element;
  said positioning relation specifying means specifies a relative positioning relation on the two-dimensional plane of said plurality of points stored in said point storing means.

7. The drawing system of claim 1, wherein said specifying means comprises at least one of:
  positioning relation specifying means for specifying a drawing rule concerning the positioning relation of said one drawing element and the other drawing element;
  shape specifying means for specifying a drawing rule concerning a shape of said one drawing element;
  color specifying means for specifying a drawing rule concerning a color of said one drawing element.

8. The drawing system of claim 7, further comprising:

point storing means for storing a plurality of points on each of which the drawing element included in the drawing to be created is placed with an identifier to uniquely identify each point;

said reading means reads an picture drawn on a medium on which a plurality of points corresponding to said points stored in said point storing means is previously drawn, to generate image information used for instruction;

said detecting means detects said one drawing element and said points from the image information, and detects said positioning relation of said one drawing element and the other drawing element by associating the detected drawing element with an appropriate one of the point stored in said point storing means; and said positioning relation specifying means specifies a relative positioning relation on the two-dimensional plane of said plurality of points stored in said point storing means.

9. The drawing system of claim 1, further comprising:

said detecting means detecting the direction of the drawing element from the image information used for instruction; and direction change means for changing the detected direction of the detected drawing element in accordance with said positioning relation specified by said detecting means and said drawing rule specified by said specifying means.

10. The drawing system of claim 1, further comprising:

storage means for storing a plurality of drawing rules which are applied to the drawing to be created;

display means for displaying said plurality of drawing rules stored in said storage means; and said specifying means selecting at least one from said plurality of drawing rules displayed by said display means.

11. A drawing system comprising: first specifying means for specifying one drawing element which is included in a drawing to be created and for specifying the positioning relation of said one drawing element and another drawing element;

second specifying means for specifying a drawing rule which is applied to the drawing to be created, said second specifying means comprising positioning relation specifying means for specifying a drawing rule concerning the positioning relation of said one drawing element and said another drawing element; and image generating means for generating image information representing the drawing to be created in accordance with said specifying of said first specifying means and second specifying means.

12. A drawing system comprising:

first specifying means for specifying one drawing element which is included in a drawing to be created and for specifying the positioning relation of said one drawing element and another drawing element;

storage means for storing a plurality of drawing rules which are applied to the drawing to be created;

display means for displaying said plurality of drawing rules stored in said storage means;

second specifying means for specifying a drawing rule which is applied to the drawing to be created, said second specifying means selecting at least one from said plurality of drawing rules displayed by said display means; and image generating means for generating image information representing the drawing to be created in accordance with said specifying of said first specifying means and second specifying means.

* * * * *